(12) United States Patent  
Sheppard et al.

(10) Patent No.: US 8,469,139 B2  
(45) Date of Patent: Jun. 25, 2013

(54) METHOD OF RELIEVING POWER STEERING ASSIST AND A POWER STEERING SYSTEM UTILIZING THE METHOD

(75) Inventors: Peter H. Sheppard, Hanover, PA (US); Kenneth Giurlando, Lancaster, PA (US)

(73) Assignee: R.H. Sheppard Co., Inc., Hanover, PA (US)

( * ) Notice: Subject to any disclaimer, the term of this patent is extended or adjusted under 35 U.S.C. 154(b) by 31 days.

(21) Appl. No.: 13/143,748

(22) PCT Filed: Mar. 12, 2010

(86) PCT No.: PCT/US2010/027113  
§ 371 (c)(1),  
(2), (4) Date: Jul. 8, 2011

(87) PCT Pub. No.: WO2010/105138  
PCT Pub. Date: Sep. 16, 2010

(65) Prior Publication Data  
US 2011/0266084 A1 Nov. 3, 2011

Related U.S. Application Data

(60) Provisional application No. 61/159,464, filed on Mar. 12, 2009.

(51) Int. Cl.  
*B62D 5/06* (2006.01)

(52) U.S. Cl.  
USPC ........... 180/441; 180/442; 180/417; 180/433; 180/434

(58) Field of Classification Search  
USPC .......... 180/441, 442, 417, 433, 434  
See application file for complete search history.

(56) References Cited

U.S. PATENT DOCUMENTS

| | | | | |
|---|---|---|---|---|
| 5,850,888 A | * | 12/1998 | Bergmann et al. | 180/406 |
| 5,941,338 A | * | 8/1999 | Miller et al. | 180/421 |
| 7,213,676 B2 | * | 5/2007 | Soeda et al. | 180/417 |
| 7,467,683 B2 | * | 12/2008 | Malvestio | 180/266 |
| 2005/0161278 A1 | * | 7/2005 | Harnischfeger et al. | 180/441 |
| 2005/0236220 A1 | * | 10/2005 | Soeda et al. | 180/442 |

FOREIGN PATENT DOCUMENTS

| | | |
|---|---|---|
| EP | 0853030 A2 | 7/1998 |
| EP | 0916566 A1 | 5/1999 |
| EP | 1431162 A1 | 6/2004 |

OTHER PUBLICATIONS

Korean Intellectual Property Office, International Search Report issued on corresponding PCT applications, PCT/US2010/027113.

* cited by examiner

*Primary Examiner* — Tashiana Adams  
*Assistant Examiner* — Marlon Arce  
(74) *Attorney, Agent, or Firm* — Hooker & Habib, P.C.

(57) ABSTRACT

A power steering system for a ground vehicle includes an accumulator that supplies high-pressure fluid through a control valve to a fluid motor that drives the steerable wheels of the vehicle. A normally open control valve between the accumulator and the fluid motor closes prior to the steerable wheels reaching an axle stop to relieve power assist.

17 Claims, 17 Drawing Sheets

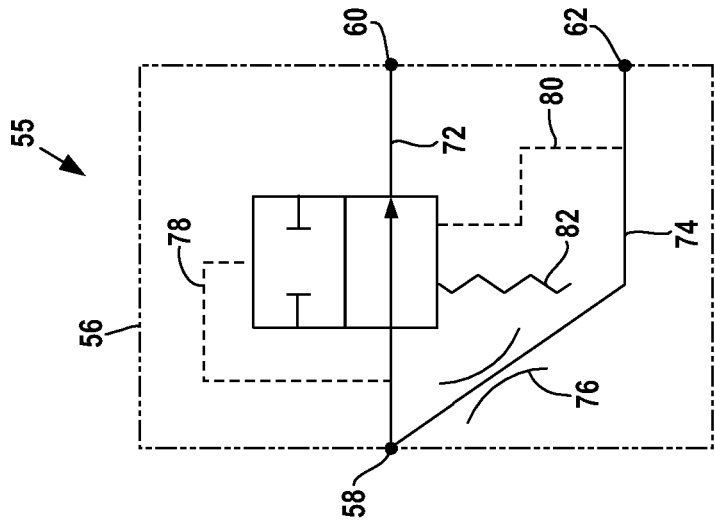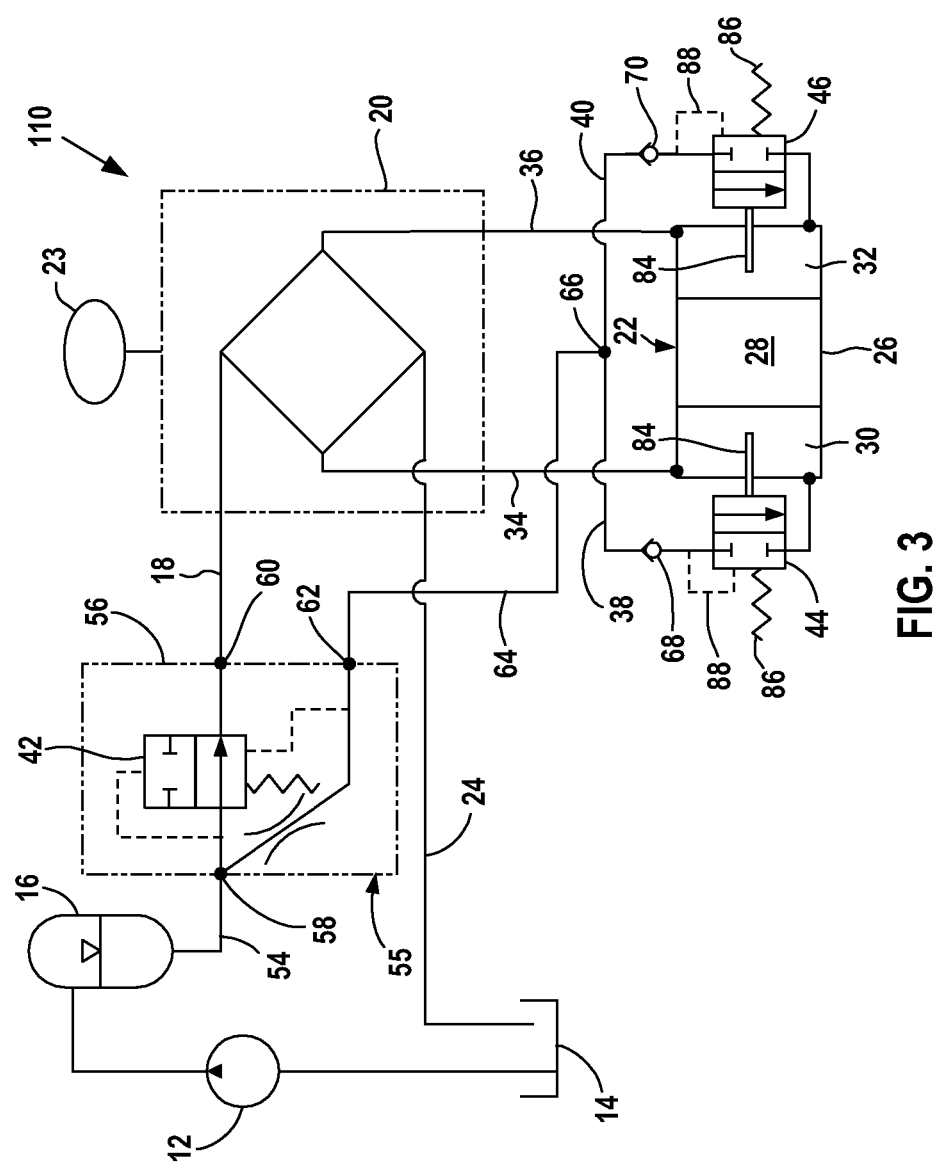

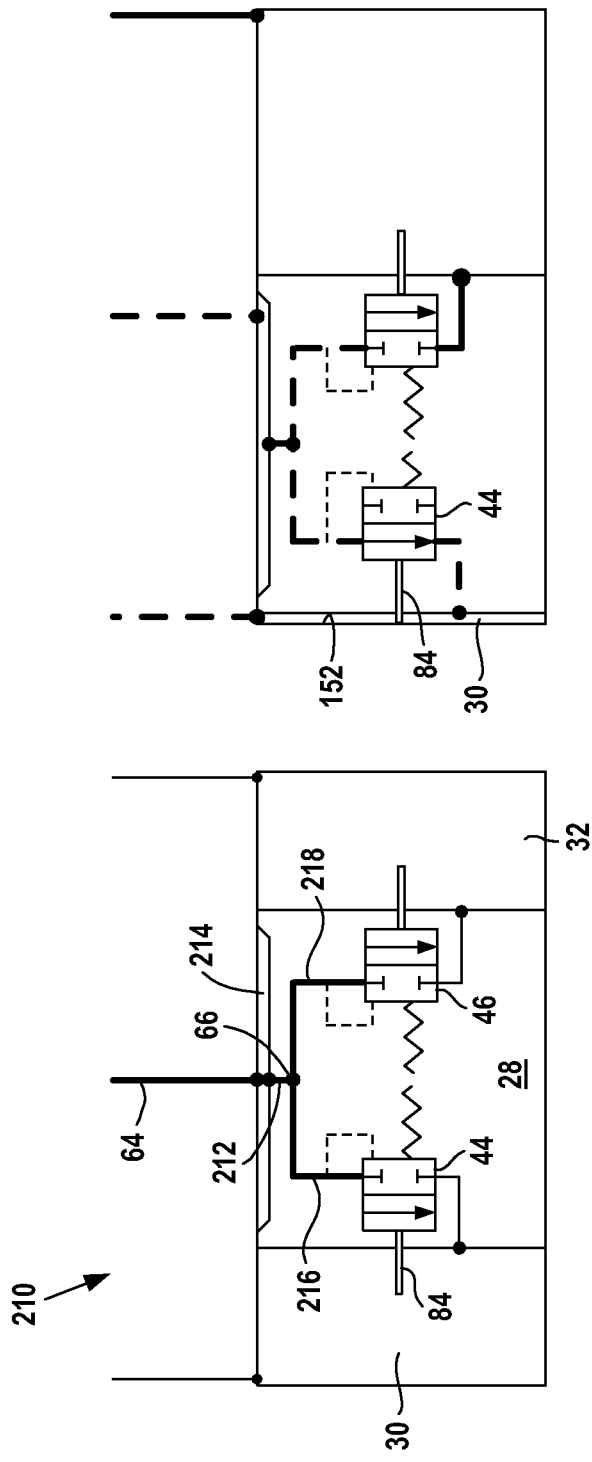

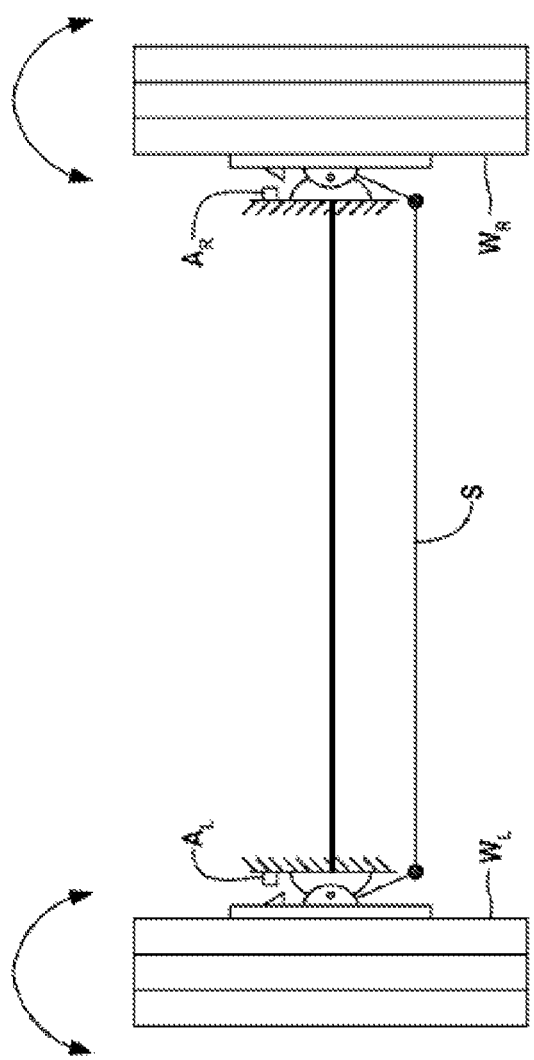

METHOD OF RELIEVING POWER STEERING ASSIST AND A POWER STEERING SYSTEM UTILIZING THE METHOD

FIELD OF THE INVENTION

The invention relates to a method of relieving power steering assist in a vehicle having a power steering system before a steerable wheel of the vehicle reaches an axle stop, and a power steering system implementing the method.

BACKGROUND OF THE INVENTION

Trucks and other ground vehicles have a hydraulic power steering system that provides power assist in turning the steerable wheels of the vehicle. The power steering system drives the steerable wheels move along a steering stroke. The ends of the steering stroke are defined by axle stops that mechanically prevent further movement of the wheels.

FIG. 23 illustrates in simplified form the front steerable wheels $W_L$, $W_R$ of a ground vehicle, the wheels connected by a steering linkage S. When the wheels are steered to the right as viewed in FIG. 23, the end of the steering stroke is defined by an axle stop $A_L$. When the wheels are steered to the left, the end of the steering stroke is defined by an axle stop $A_R$. In the illustrated embodiment the axle stops $A_L$, $A_R$ are formed from threaded bolts that extend from the vehicle frame. Other axle stop designs are known in the ground vehicle steering art.

A conventional hydraulic power steering system flows high-pressure power steering fluid to a fluid motor that has a piston within a closed hydraulic cylinder. The piston divides the cylinder into motor chambers on opposite sides of the piston. The piston is connected to a steering linkage that moves the steerable wheels along the steering stroke. The piston is axially movable in the cylinder between opposite ends of a piston stroke to actuate the steering linkage and move the steerable wheels along their steering stroke to the left or right.

To initiate a turn, the driver turns a steering wheel to cause the steerable wheels to move in the desired turning direction. The steering wheel is connected to a control valve that flows high-pressure fluid into one of the motor chambers (the "high-pressure chamber") and connects the other motor chamber (the "low-pressure chamber") to an exhaust. The fluid pressure in the high-pressure chamber generates power assist moving the piston from its centered position in the cylinder (corresponding to the centered, straight-ahead position of the steerable wheels along their steering stroke) towards the low-pressure motor chamber. This actuates the steering linkage, moving the steerable wheels in the turning direction.

It is desirable to remove power assist before the steerable wheels hit the axle stops. If the power steering system powers the steerable wheels against an axle stop, severe mechanical strain is placed on the steering linkage, the power steering components, and other component parts of the vehicle.

Conventional hydraulic power steering systems remove power assist before the steerable wheels reach the axle stops. The piston stops moving at an end of its piston stroke when the power assist is relieved. The end of the piston stroke occurs before the steerable wheels impact the axle stops.

To relieve power assist when the piston reaches an end of its piston stroke, a normally closed fluid line connects the two motor chambers. In many conventional systems the fluid line extends through the piston. Normally-closed check valves are located on opposite ends of the fluid line adjacent the motor chambers.

The fluid pressure in the high-pressure motor chamber opens the check valve adjacent the high-pressure motor chamber, but the fluid pressure transmitted through the fluid line from the high-pressure motor chamber urges the other check valve closed. As a result, the fluid line remains closed between the two motor chambers despite one check valve being open as the piston moves along its piston stroke from the centered position towards one end of the cylinder.

When the piston nears the end of its piston stroke, signaling that the steerable wheels are nearing the axle stops, an actuating member in the low-pressure chamber opens the check valve adjacent the low-pressure chamber. The fluid line now opens on both sides of the piston, equalizing the pressure in the two motor chambers and stopping the piston at the end of its piston stroke before the steerable wheels hit the axle stops.

If the steering wheel is now turned to return the steerable wheels towards their centered or straight-ahead position, the control valve connects the one motor chamber to exhaust and connects the other motor chamber to the high-pressure fluid. The check valve adjacent the one motor chamber closes from the loss of fluid pressure in the chamber, closing the fluid line and enabling the high pressure in the other motor chamber to reverse the motion of the piston. The piston begins moving towards the other end of the hydraulic cylinder and moves the steerable wheels away from the axle stops towards their centered position.

The method of relieving power assist by opening a fluid line between the two motor chambers for direct fluid communication between the two chambers has worked well for many years. Power steering systems have conventionally used an engine-driven pump to continuously flow high-pressure fluid to an open-center control valve. The open-center control valve continuously flows the power steering fluid received from the pump, even when the wheels are in a straight-ahead position and are not being turned. The continuous flow of high-pressure fluid through the control valve enables power assist to be quickly re-established after being relieved due to the piston reaching an end of its piston stroke. The power steering pump limits the flow rate through the system so that fluid flow through the system when the fluid line is open or when the check valves close does not damage system components.

Today, however, an increasing number of trucks use energy-saving power steering systems that utilize a closed-center control valve to control flow to the steering motor. A closed-center valve shuts off the flow of high-pressure fluid into the control valve when the valve is in a centered condition with the wheels not being turned. The control valve allows high-pressure fluid to flow through the valve and to the fluid motor only when the control valve is away from its centered position for turning.

Because a steering system utilizing a closed-center valve does not require a continuous flow of high-pressure fluid, power steering fluid is provided to the control valve when needed from a gas-pressurized accumulator. An electric motor intermittently supplies power steering fluid to the accumulator from a reservoir on an as-needed basis when the fluid volume or fluid pressure in the accumulator drops below some minimum level.

Opening a fluid line between the motor chambers to equalize fluid pressures and relieve power steering will work with a closed-center type power steering system, but does not work well. The fluid flow through the motor chambers rapidly depletes the energy stored in the accumulator, depleting the accumulator within a few seconds. The result is a time delay until the accumulator is recharged and power steering assist can be reestablished. During the delay, steering would be manual and unsatisfactory.

Furthermore, when the fluid line is open between motor chambers the flow of fluid discharged from the accumulator is not regulated by the power steering system. A high flow rate through the piston may damage one or both of the check valves, preventing the valve from closing.

Thus there is a need for an improved method of relieving power assist from a power steering system before the steerable wheels of a vehicle reach the axle stops. The method should limit the rate energy is depleted in the system so that power assist can be quickly reestablished, and regulate the flow of fluid through the system while power assist is being relieved to avoid damage to system components.

SUMMARY OF THE INVENTION

The invention is an improved method of relieving power assist provided by a power steering system before the steerable wheels of a vehicle hit the axle stops. The power steering system is of the type having a source of high-pressure fluid, a piston in a hydraulic cylinder and sealingly dividing the cylinder into two fluidly separated chambers on opposite sides of the piston, a first fluid line fluidly connecting the fluid source with one of the cylinder chambers and a second fluid line connecting the other cylinder chamber to an exhaust whereby fluid pressure in the one, high-pressure chamber forces the piston to move in the cylinder towards an end of the piston stroke, moving the steerable wheels towards an end of their steering stroke.

The method in accordance with the present invention includes the step of closing the first fluid line or the second fluid line before the wheels hit the axle stop. Closing the fluid line removes power assist before the wheels hit the axle stop.

Closing the fluid line stops the flow of fluid into or out of the fluid motor, creating a hydraulic lock condition in the fluid motor. Fluid already in the high-pressure motor chamber is trapped inside the motor chamber. Except for any leakage, fluid flow in the power steering system stops and system energy loss is essentially eliminated while the power assist is being relieved.

In a preferred embodiment of the method a normally open shutoff valve is placed in the fluid line. The shutoff valve is responsive to a signal transmitted to the shutoff valve indicating the wheels are approaching or nearing the axle stop to close and thereby close the fluid line. The signal may be a fluid pressure signal or an electrical signal.

A power steering system that implements the method of relieving power assist in accordance with the present invention includes a fluid motor, first and second motor lines, a source of high-pressure fluid, a supply line fluidly connected to the fluid source, an exhaust lien fluidly connected to the exhaust, a control valve, and a first shutoff valve.

The fluid motor has a piston axially movable for moving the steerable wheel along the steering stroke, the piston dividing the cylinder into first and second motor chambers on opposite sides of the piston. The first motor line is fluidly connected to the first motor chamber and the second motor line is fluidly connected to the second motor chamber.

The control valve is connected to the supply line, the exhaust line, and the first and second motor lines. The control valve is placeable in centered and non-centered conditions in response to driver steering input, the control valve when in the non-centered condition fluidly interconnecting the supply line and the first motor line to form a high-pressure line from the high-pressure fluid source to the first motor chamber and fluidly interconnecting the exhaust line and the second motor line to form a low-pressure line from the second motor chamber to the exhaust whereby fluid pressure in the first motor chamber urges the piston towards the second motor chamber.

When the control valve is in the non-centered condition the shutoff valve is disposed in either of the high-pressure line or the low-pressure line. The shutoff valve is open when the steerable wheel is away from the axle stop and permitting flow through the line associated with the shutoff valve. The shutoff valve closes when the steerable wheel approaches the axle stop, thereby blocking fluid flow through the line associated with the shutoff valve.

The shutoff valve is preferably connected to a signal line that transmits a signal to the shutoff valve that the steerable wheel is approaching the axle stop. In preferred embodiments the signal line is a fluid line extending from the shutoff valve to one of the motor chambers. When the steerable wheel approaches the axle stop, the shutoff valve comes into fluid communication with the one motor chamber, the fluid pressure in the one motor chamber generating a pressure signal to actuate and close the shutoff valve. A flow restriction in the signal line reduces system energy losses while the shutoff valve is closed.

The shutoff valve can be entirely or partially electrically actuated, mechanically actuated, or hydraulically actuated. In preferred embodiments of the power steering system the normally-open shutoff valve is hydraulically opened and closed (with some spring assist) utilizing fluid pressures in the power steering system. This enables the power steering system to be self-contained and installed as a unit without the need for contact switches or actuators cooperating with other vehicle component parts.

The power steering system of the present invention is particularly advantageous when an accumulator is the source of high-pressure fluid. The reduced rate of energy loss and regulated flow while power steering assist is being relieved enables a driver to quickly regain power steering assist when the vehicle's steerable wheels start returning towards their centered position.

Other objects and features of the invention will become apparent as the description proceeds, especially when taken in conjunction with the accompanying drawing sheets illustrating multiple embodiments of the invention.

BRIEF DESCRIPTION OF THE DRAWINGS

FIG. 3 illustrates another embodiment of the power steering system in accordance with the present invention;

FIG. 4 is an enlarged view of the control block of the power steering system shown in FIG. 3;

FIG. 11 illustrates a portion of yet another embodiment of the power steering system in accordance with the present invention;

FIG. 12 illustrates the power steering system shown in FIG. 11 relieving power assist when the piston reaches an end of its piston stroke;

FIG. 23 illustrates in simplified form the front steerable wheels of a ground vehicle and the axle stops limiting steering stroke of the wheels.

DETAILED DESCRIPTION OF THE INVENTION

Figure 1:
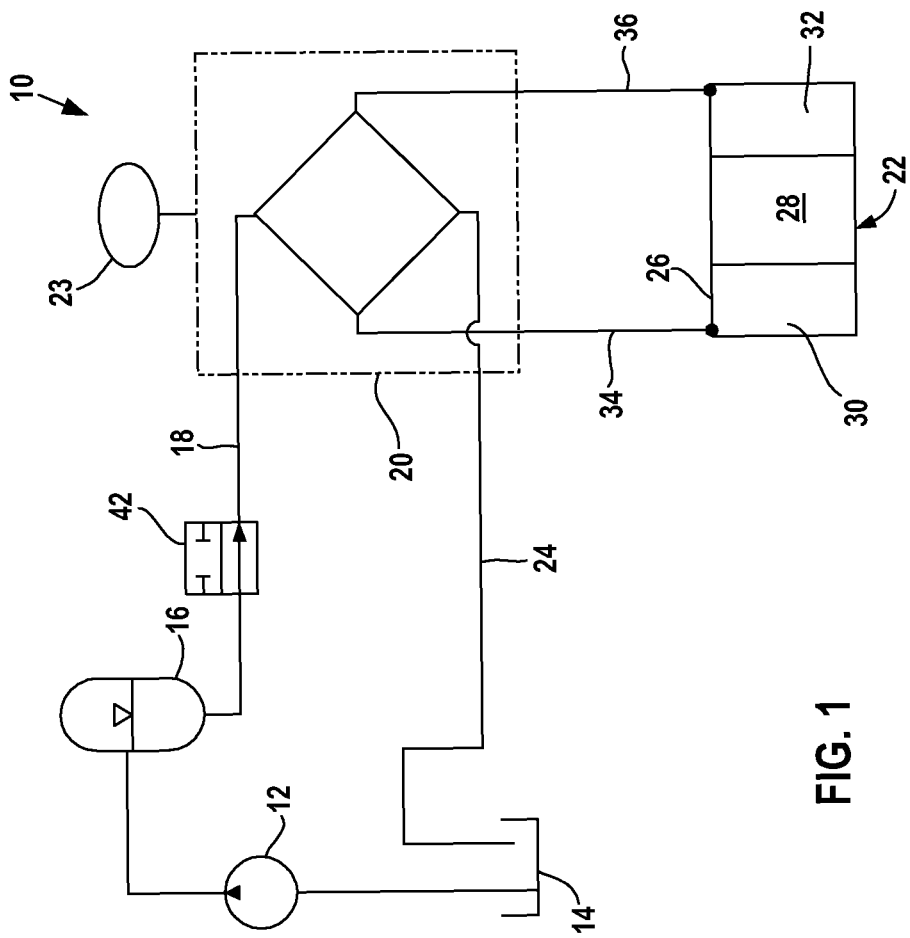
FIG. 1 illustrates a power steering system that relieves power steering assist in accordance with the present invention.
Figure 2:
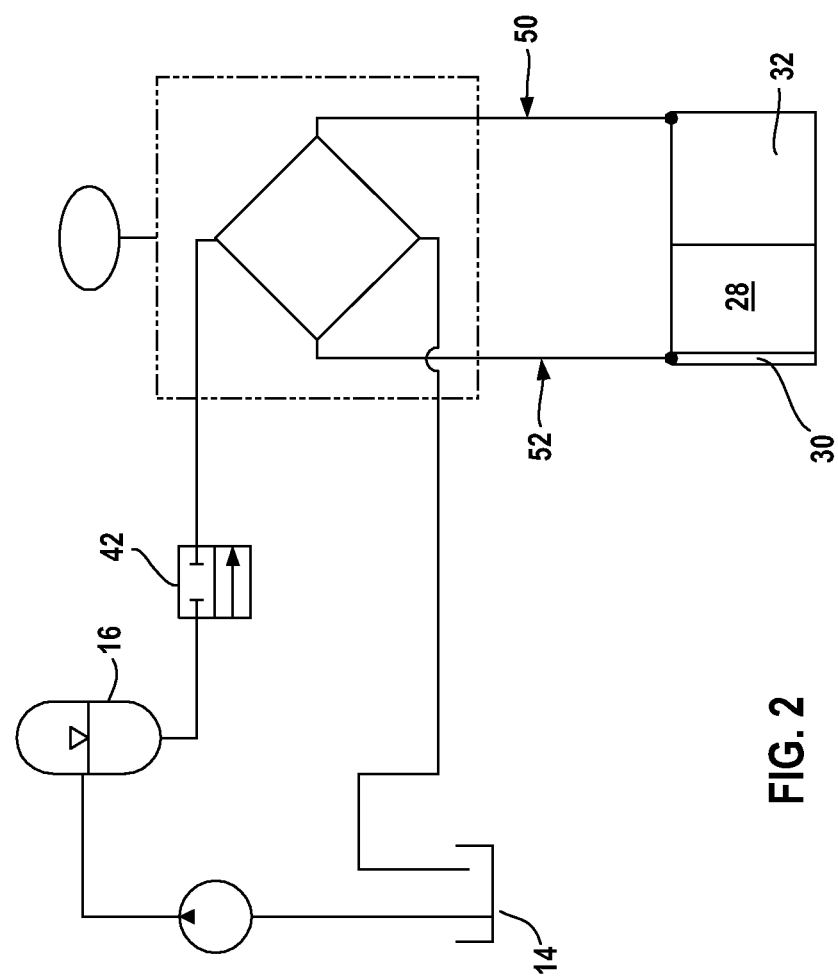
FIG. 2 illustrates the power steering system of FIG. 1 with the piston at the end of its piston stroke and power assist being relieved.

FIGS. 1 and 2 illustrate the basic method of the present invention to relieve power assist provided by a power steering system 10 before the steerable wheels of a ground vehicle hit the axle stops.

The power steering system 10 includes a motor 12 that intermittently supplies power steering fluid from a reservoir 14 to a gas-pressurized accumulator 16. The illustrated motor 12 is an electric motor, but other types of motors can be used as is known in the power steering art. A first fluid line or valve supply line 18 fluidly connects the accumulator 16 with a conventional closed-center steering valve or control valve 20. The control valve 20 controls the flow of fluid to a fluid motor 22 in a conventional manner in response to a steering input. The steering input is represented by a steering wheel 23 connected to the control valve 20, it being understood that steering input may be provided by other input mechanisms as are known in the steerable vehicle art. An exhaust line 24 fluidly connects the control valve 20 with the reservoir 14 and returns the fluid to the reservoir.

The fluid motor 22 includes a hydraulic cylinder 26 and a piston 28 axially movable in the cylinder 26. The piston 28 is connected to the steerable wheels of the vehicle by a steering linkage (not shown) in a conventional manner, with movement of the piston moving the steerable wheels along a steering stroke. The piston 28 sealingly divides the cylinder 26 into a left cylinder chamber or motor chamber 30 and a right cylinder chamber or motor chamber 32. A left valve line 34 fluidly connects the left motor chamber 30 and the control valve 20 and a right valve line 36 fluidly connects the right motor chamber 32 with the control valve 20.

A normally-open shutoff valve 42 is located in the first supply line 18

FIG. 1 illustrates the power steering system 10 in its centered condition with the piston 28 centered in the cylinder and representing a centered position of the vehicle steerable wheels. The shutoff valve 42 is open and the power steering system 10 operates in a conventional manner in this operating condition.

In response to a steering input that, for example, would move the piston 28 to the left as shown in FIG. 1 the control valve 20 fluidly connects the right valve line 36 and the valve supply line 18. This forms a high-pressure line 50 that fluidly connects the accumulator and the right motor chamber 32 (see FIG. 2). The control valve 20 fluidly connects the left valve line 34 and the exhaust line 24, forming an exhaust line 52 that fluidly connects the left motor chamber 30 and the exhaust fluid reservoir 14. The pressure difference in the motor chambers moves the piston 28 left, with high-pressure fluid flowing into the right, high-pressure motor chamber 32 through the high-pressure line 50 and low-pressure fluid flowing out of the left low-pressure motor chamber 30.

FIG. 2 illustrates the power steering system 10 when the piston 28 has reached the left end of its piston stroke and power steering assist is relieved. The steerable wheels are spaced from the axle stop.

In response to the piston 28 reaching the end of its piston stroke, the normally-open shutoff valve 42 closes (as will be described in greater detail below using specific embodiments of power steering systems that implement the present method). The high-pressure fluid in the right motor chamber 32 is "trapped" between the piston 28 and the high-pressure fluid in the high-pressure line 50 causing a hydraulic lock of the piston 28. Because fluid can no longer flow into the high-pressure chamber 32, movement of the piston 28 stops and thereby relieves power assist.

While the shutoff valve 42 remains closed, there is no fluid flow through the power steering system 10 (disregarding any leakage flow). There is essentially no energy being lost in the system 10, including the accumulator 16, while the valve 42 is closed. The accumulator 16 can quickly restore power steering assist when the valve 42 opens to restore power steering.

The power steering system 10 operates in a similar way when the piston 28 reaches the right-hand end of its piston stroke to relieve power assist, the normally-open shutoff valve 42 closing and stopping flow of high-pressure fluid from the accumulator 16 into the high-pressure motor chamber 32.

FIG. 3 illustrates a power steering system 110 that implements the method illustrated in FIGS. 1 and 2. Components shown in FIG. 3 that are also present in FIG. 1 are numbered with the same reference numerals. In this embodiment the power steering system 110 is similar to the system 10 but utilizes changes in internal system pressure as signals for closing and opening the valve 42.

The power steering system 110 includes a left fluid supply line or left signal line 38 that fluidly connects the accumulator 16 and the left motor chamber 30 and a right fluid supply line 40 that fluidly connects the accumulator 16 and the right motor chamber 32. A first normally-closed shutoff valve 44 is located in the left signal line 38, and a second normally-closed shutoff valve 46 is located in the left signal line 40.

The valve supply line 18, the left supply line 38, and the right supply line 40 share a common fluid line segment 54 that extends from the accumulator 16 to the normally-open shutoff-valve 42. The shutoff-valve 42 is located in a control block 55. The control block 55 defines a valve body 56 (indicated in phantom lines) having an inlet 58, a first outlet 60, and a second outlet 62. The common line segment 54 is attached to the inlet 58. The portion of the valve supply line 18 extending from the shutoff valve 42 is attached to the first outlet 60. The second and third supply lines 38, 40 share a second common fluid line segment 64 that is attached to the second outlet 62 and extends to a junction 66 where the two supply lines 38, 40 divide. Check valves 68, 70 are located in the supply lines 38, 40 respectively downstream from the junction 66 as shown and prevent fluid flow in the lines 38, 40 from the hydraulic cylinder 26 towards the accumulator 16.

The valve body 56 defines internal flow channels or fluid lines 72, 74. See FIG. 4. The fluid line 72 forms part of the valve supply line 18 and fluidly connects the valve inlet 58 and the first valve outlet 60, with the shutoff valve 42 in the line 72 to open or close the valve supply line 18. The fluid line 74 forms part of the second common line segment 64 and fluidly connects the inlet 58 and the second outlet 62. The valve body 56 also defines an orifice, or flow restriction 76 in the fluid line 74.

The shutoff valve 42 is a hydraulically actuated valve. The valve body 56 defines a first pilot line 78 that extends from the fluid line 72 and urges the valve 42 closed, and a second pilot line 80 that extends from the fluid line 74 and urges the valve 42 open. The second pilot line 80 connects with the fluid line 74 downstream from the flow restriction 76 so that the fluid pressure in the pilot line 80 reflects any pressure drop caused by flow through the flow restriction 76. The valve body 56 houses a spring 82 that cooperates with the pilot line 80 in urging the shutoff valve 42 open. Due to the balanced hydraulic forces generated by the pilot lines 78, 80, the spring 82 must generate only a relatively low mechanical spring force to maintain the valve 42 open. This enables use of a relatively weak and compact spring 82.

Referring back to FIG. 3, the first and second normally-closed shutoff valves 44, 46 are mechanically actuated to open. In the illustrated embodiment each valve 44, 46 has an actuating member or plunger 84 that extends from a respective end of the hydraulic cylinder 26 and into the left and right motor chambers 30, 32 respectively. The plungers 84 engage the piston 28 and open the valve 44 or 46 when the piston 28 reaches a respective end of its piston stroke. A spring 86 and a pilot line 88 fluidly connected to the valve supply line 38 or 40 urge each shutoff valve 44, 46 closed when the piston 28 is away from the valve's plunger 84.

FIG. 3 illustrates the power steering system 110 with the piston 28 in its centered position, corresponding to the steerable wheels of the vehicle being centered. It is assumed that all the fluid lines are filled with fluid.

The shutoff valves 44, 46 are each kept closed by the combination of mechanical and hydraulic closing forces generated by the spring 86 and the pilot line 88. No power steering fluid flows through the first and second supply lines 38, 40. The pilot lines 88 see full system pressure because there is no pressure loss generated by fluid flow through the flow restriction 76. This enables a relatively compact and weak spring 88 to generate sufficient spring force to keep its valve 44 or 46 closed.

During normal vehicle operation in which the piston 28 does not reach the ends of its piston stroke, the power steering system 110 operates like a conventional closed-center power steering system. The shutoff valves 44 and 46 are closed and so there is no fluid flow through the signal lines 34, 36. The stationary fluid in the signal lines 34, 36 between the accumulator 16 and the respective shutoff valves 44, 46 is at full system pressure, the full system pressure acting as a signal or representing a signal level that the piston 28 has not reached an end of its piston stroke.

Figure 5:
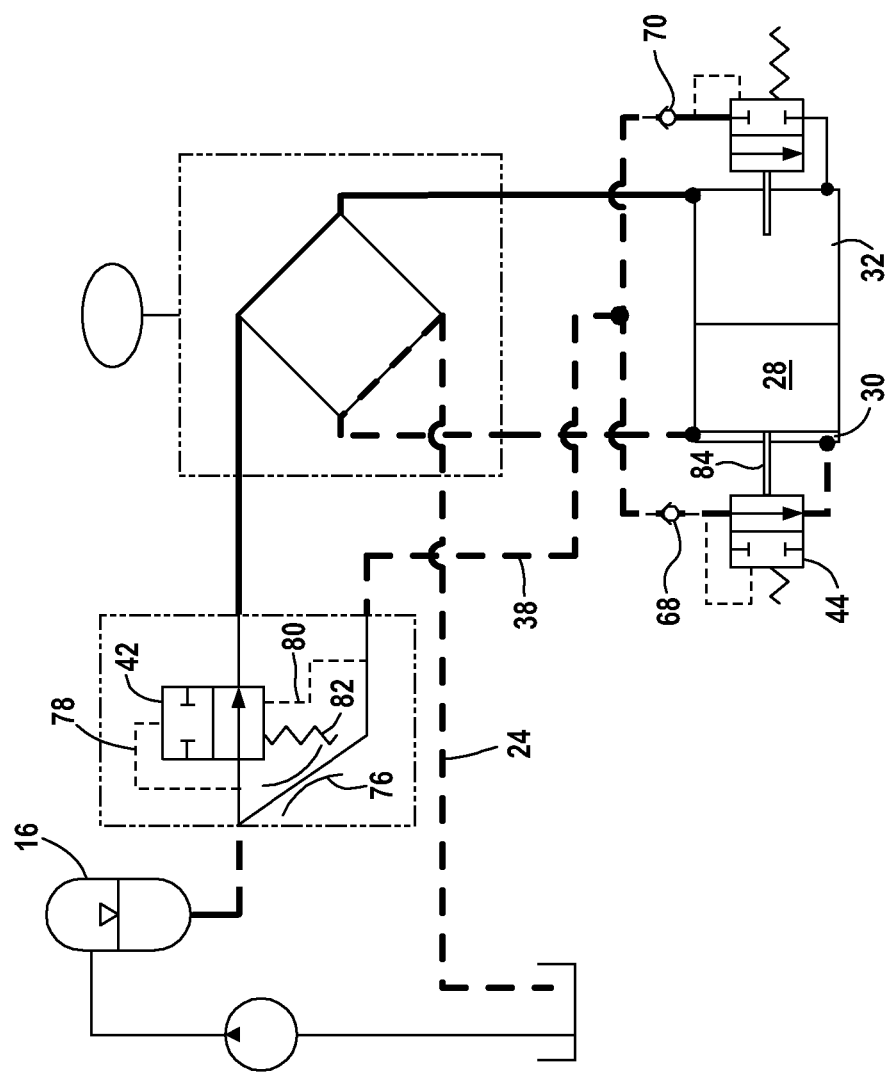
FIGS. 5 and 6 illustrate the power steering system of FIG. 3 relieving power assist when the piston reaches an end of its piston stroke.
Figure 6:
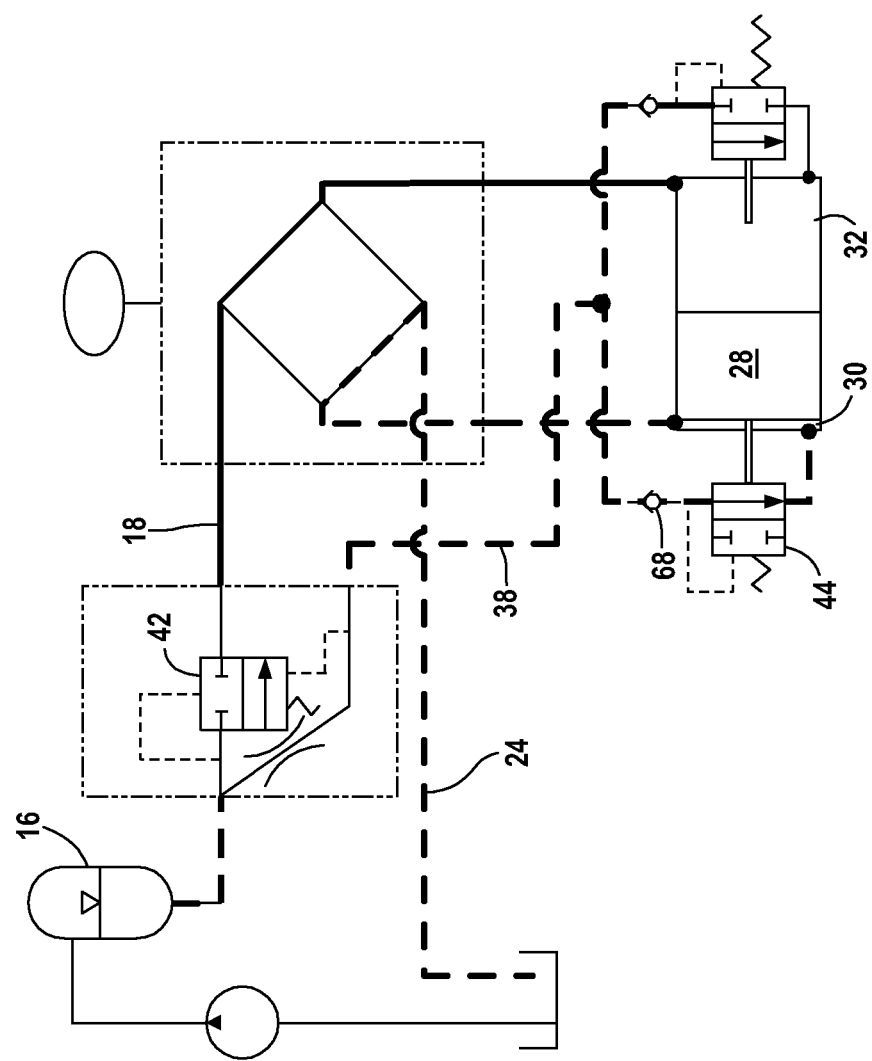

FIGS. 5 and 6 illustrate the power steering system 110 when the piston 28 reaches the left end of its piston stroke, corresponding to the system condition shown in FIG. 2. For better clarity of description, FIGS. 5 and 6 illustrate sequentially what is essentially a simultaneous change in the operating state of the power steering system 110 in response to the piston 28 reaching the end of its stroke. In the figures fluid lines carrying high-pressure fluid are shown in thick solid lines and fluid lines connected to exhaust are shown in thick dashed lines.

As shown in FIG. 5, the piston 28 engages and pushes against the left plunger 84. This opens the shutoff valve 44 and establishes fluid communication between the accumulator 16 and the left motor chamber 30 through the left signal line 38. The open valve 44 connects the end of the signal line 38 to the left motor chamber 30 and so to exhaust line 24. Fluid flows from the accumulator 16 to the reservoir 14 via the supply line 38, motor chamber 30, fluid line 34, control valve 20, and the exhaust line 24. Check valve 68 prevents high-pressure fluid from flowing back into the signal line 38.

Because the signal line 38 now connects the accumulator 16 to exhaust, the pressure of the fluid flowing through the signal line 38 downstream from the flow restriction 76 drops to essentially exhaust pressure. The low fluid pressure in the signal line 38 acts as is a signal or represents a signal level indicating that the piston 28 has reached an end of its piston stroke.

The flow restriction 76 limits the rate of flow through the signal line 38 and minimizes system energy loss while the piston 28 is at the end of its stroke.

FIG. 6 illustrates the power steering system 110 after the shutoff valve 42 closes, it being understood that the shutoff valve 42 closes substantially simultaneously with the opening of the shutoff valve 44. The shutoff valve 42 closes the valve supply line 18, trapping the high-pressure fluid in the right motor chamber 32 as previously described. The piston 28 becomes stationary at the end of its piston stroke as shown in FIG. 6, and power steering assist is relieved.

While power assist is relieved, the flow restriction 76 and the signal line 38 cooperate to regulate fluid flow from the accumulator 16. The cross-sectional area of the supply line 38 is preferably substantially less than the cross-section area of the supply line 18.

After power steering assist is relieved, letting go of the steering wheel 23 will re-open shutoff valve 42 and enable power steering assist and begin moving the piston 28 towards its centered position. Letting go of the steering wheel re-centers the control valve 20. The centered control valve 20 connects both motor chambers 30, 32 to exhaust, equalizing the pressure on both sides of the piston 28. The caster of the axle drives the piston 28 back towards its centered position, closing the shutoff valve 44. Static pressure in the signal line 38 returns to full system pressure, reopening the shutoff valve 42 and thereby reopening the valve supply line 18.

The power steering system 110 operates in a similar manner as described above to relieve power assist when the piston 28 reaches the right end of its piston stroke. The piston 28 opens the shutoff valve 46, reducing the pressure in the right signal line 40 and thereby shutting off the valve 42 and stop further movement of the piston 28.

Figure 7:
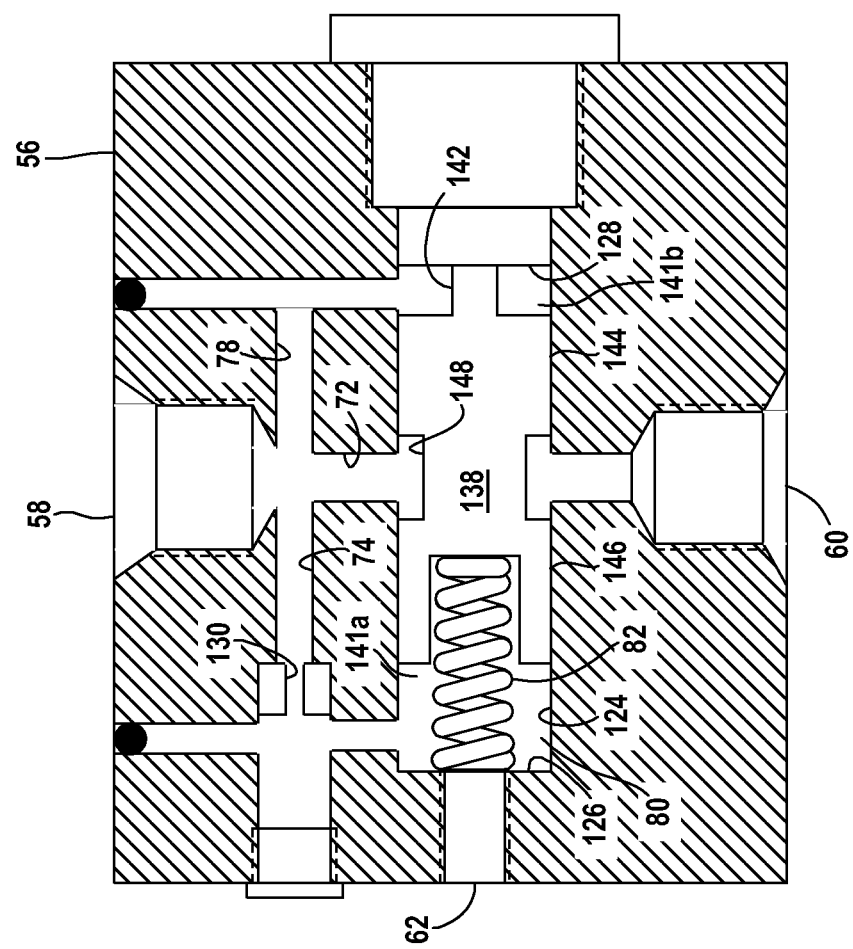
FIG. 7 is a sectional view of the valve body of the power steering system shown in FIG. 3.

FIG. 7 illustrates an embodiment of the valve body 56. The flow channel 72 fluidly connecting ports 58 and 60 and the flow channel 74 fluidly connecting the ports 58 and 62 are each intersected by a control channel formed as a cylindrical bore 124 that is closed by axially opposite end walls 126, 128. The flow channel 72 intersects the bore 124 in a center portion of the bore 124. The flow channel 74 intersects the bore 124 near the end wall 126 and extends through the end wall 126 to the port 62. The flow restriction 76 is formed as a reduced-diameter flow orifice 130 in the flow channel 74.

An axially-movable slide member or valving member formed as a spool valve 138 is located in the control channel 124. The spool valve 138 is biased towards the end wall 128 by the compression spring 82. The spool valve 138 sealingly divides the control channel 124 into a first chamber 141a adjacent the end wall 126 and a second chamber 141b adjacent the end wall 128. Chamber 141a defines the pilot line 80 pressurized by the flow line 74. Chamber 141b forms the end of the pilot line 78 pressurized by the flow line 72. The spool valve 138 includes a reduced-diameter nose 142 facing the end wall 128, and two sealing lands 144, 146 spaced apart by an annular recess 148. The recess 148 fluidly connects the ends of the flow channel 72 when the nose 142 is against the end wall 128.

During normal power steering operation with the piston 28 between the ends of the piston stroke, high-pressure fluid communicates with the chambers 141a and 141b through the pilot lines 80 and 78 respectively. Because the fluid cannot flow out the outlet 62 (shutoff valves 44 46 are closed), fluid pressures on both sides of the spool valve 138 are essentially equal and the spring 82 holds the spool valve 138 against the end wall 128.

When the piston 28 reaches an end of the piston stroke, fluid flowing out from the valve body 56 through the fluid line 74 must pass through the orifice 130, dropping the fluid pressure in the pilot line 80 (the chamber portion 141a). The drop in fluid pressure on one side of the spool valve enables the hydraulic force generated by the fluid in the chamber 141b to overcome the spring force generated by the spring 82, moving the spool valve 138 to the left as shown in FIG. 7. The spool valve 138 is stopped at its closed position by engagement with a stop member (not shown) but can be stopped in the closed position by engaging the wall 126 or by solid compression of the spring 82. Regardless of how the valve 138 is stopped, the line 74 remains unimpeded whether the valve 138 is in the opened or closed position. The spool land 144 obstructs the flow channel 72 when the spool valve is in its closed position, closing the valve 42 and shutting off the fluid line 72.

When the flow channel 72 is closed by the spool valve 138 being in its closed position, the flow out of the valve body 56 is from fluid that must pass through the flow orifice 130. As previously mentioned, the drop in accumulator pressure caused by this relatively low fluid flow is minimal compared to the loss of accumulator pressure in a conventional system that does not regulate flow out of the accumulator.

As the piston 28 moves from the end of travel towards its centered position, flow out of the valve 56 stops. Fluid pressures in the chambers 141a and 141b equalizes and the spool valve returns to its normal opened position against the end wall 142. Spool valve recess 148 fluidly re-connects the ends of the flow line 72, re-opening the shutoff valve 42.

Figure 8:
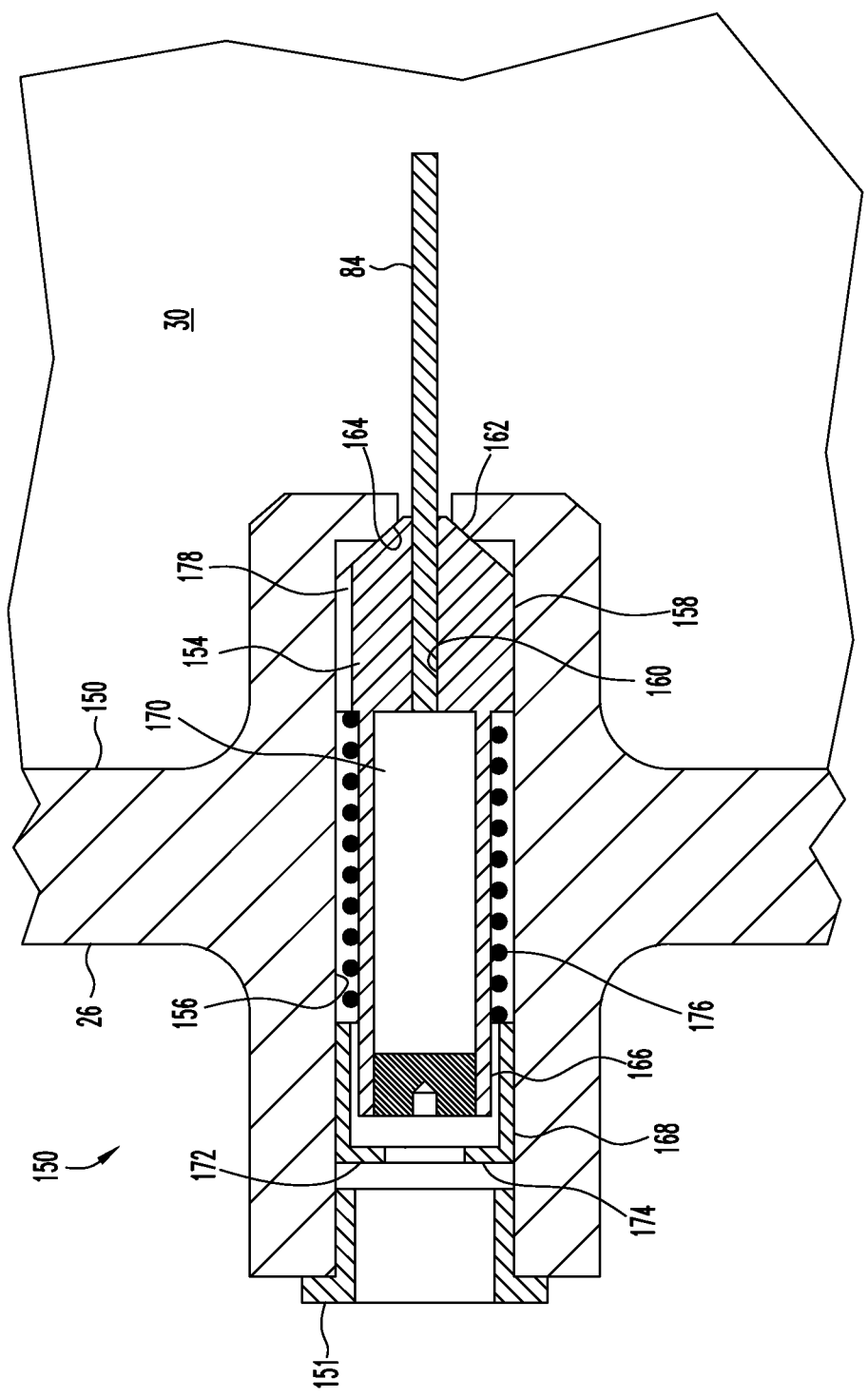
FIG. 8 is a sectional view of a first embodiment normally-closed shutoff valve for use with the power steering system shown in FIG. 3.

FIG. 8 illustrates a first embodiment normally-closed shutoff valve 150 suitable for use as a valve 44 or valve 46. The shutoff valve 150 permits automatic adjustment of the distance the valve plunger 84 extends into the motor chamber 30 to assure that power steering assist is relieved before the steerable wheels hit the axle stops. The plunger 84 is formed as a roll pin that enables relative movement between the plunger and a valving member to adjustably set the extension distance.

The shutoff valve 150 is mounted on an end wall 152 closing one end of the hydraulic cylinder 26. The valve plunger 84 extends through the end wall 152 and into the adjacent cylinder chamber 30, 32 (FIG. 8 illustrates the shutoff valve 150 forming the valve 44).

The shutoff valve 150 includes an elongate valving body 154 that is axially movable along a valve stroke in a bore 156 extending through the thickness of the end wall 152. The bore 156 is connected to a conventional SAE plug 157 that receives an end of the supply line 38 (not shown).

The valving body 154 has a head 158 closely received in the bore 156 having a central bore 160 that receives the plunger 84. An outer conical valve surface 162 on the head 158 cooperates with a conical valve seat 164 in the bore 156 to open and close the bore 156 with axial movement of the valving body 154. The valving body 154 includes an elongate, reduced-diameter tube 166 that extends away from the valve head 158 and is received in an open end of a tubular retainer 168 axially fixed in the bore 156. The tube 166 defines an interior bore 170 that is open to and concentric with the central valve head bore 160.

The retainer 168 has an open end wall 172 that permits fluid flow through the retainer 168. A set screw 174 closes the open end of the tube 166 and prevents fluid from flowing into the tube 166. A compression spring 176 surrounds the outside of the tube 166 and is compressed between the spring retainer 168 and the valving head 158, urging the valve surface 162 against the valve seat 164 to close the shutoff valve.

Prior to adjustment the plunger 84 extends into the motor chamber 30 sufficiently for the piston to engage the plunger well before the wheels reach the axle stop. Adjusting the plunger 84 is similar to the method described for adjusting the relief valve in co-inventor Sheppard's U.S. Pat. No. 5,803, 201 "Hydraulic power steering gear assembly with unloading valve", assigned to the assignee of the present invention and incorporated herein by reference as if fully set forth herein.

The vehicle is raised to lift the steerable wheels off the ground. The steering wheel is turned to move the piston 28 towards the cylinder end wall 152. When the piston 28 contacts the roll pin 84, the piston 28 pushes the valving body 154 off the valve seat 164 and towards the spring retainer 168. Continuing to turn the steering wheel causes the valving body 154 to move against the retainer end wall 172, preventing further axial movement of the valving body. In the illustrated embodiment the valving body 154 has a one-eighth inch valve stroke defined by the end of the valving body 154 being spaced one-eighths inch from the wall 172 when the valve is closed.

Continued movement of the piston 28 against the plunger 84 as the steerable wheels approach the axle stop overcomes the friction between the plunger 84 and the wall of the bore 160, causing the plunger 84 to slide in the bore 160 and move partially into the tube 166. When the steerable wheels hit the axle stop, the piston stops at its closed position to the cylinder end wall 152. The axial position of the plunger 84 with respect to the valve body 154 is now established.

When the steerable wheels move back towards their centered position, the spring 176 forces the valving body 154 and the plunger 84 to move together the one-eighth inch towards the valve seat 164 until the valve surface 162 engages the valve seat 164 and closes the valve. The piston 28 will now engage the plunger 84 one-eighth of an inch before the piston reaches its nearest position with the end wall 152 to remove power assist before the steerable wheels hit the axle stop.

The illustrated shutoff valve 150 uses the end of the spring retainer as an axial stop for the valving member. In other possible embodiments the SAE fitting, some other member, or the spring becoming a solid spring could be used as a stop.

During normal operation of the power steering system 110, the valve 150 is closed. Fluid pressure in the bore 156 urges the valve head 158 against the valve seat 162, biasing the valve closed.

When the piston 28 engages the plunger 84 and moves the valving body 154 off the valve seat 164, fluid flows from the supply line 38 and into the motor chamber 30 through the bore 156 to relieve power steering assist. The fluid enters the bore 156 through the SAE plug 157, flows through the retainer end wall 172, through the annular gap between the tube 166 and the spring retainer 168, and through circumferentially spaced-apart concave lobes or depressions 178 formed on the valve head 158.

When the piston 28 moves back towards its centered position, the spring 176 and the fluid pressure cooperate to force the valving body 158 against the valve seat 164 and close the valve 150.

Figure 9:
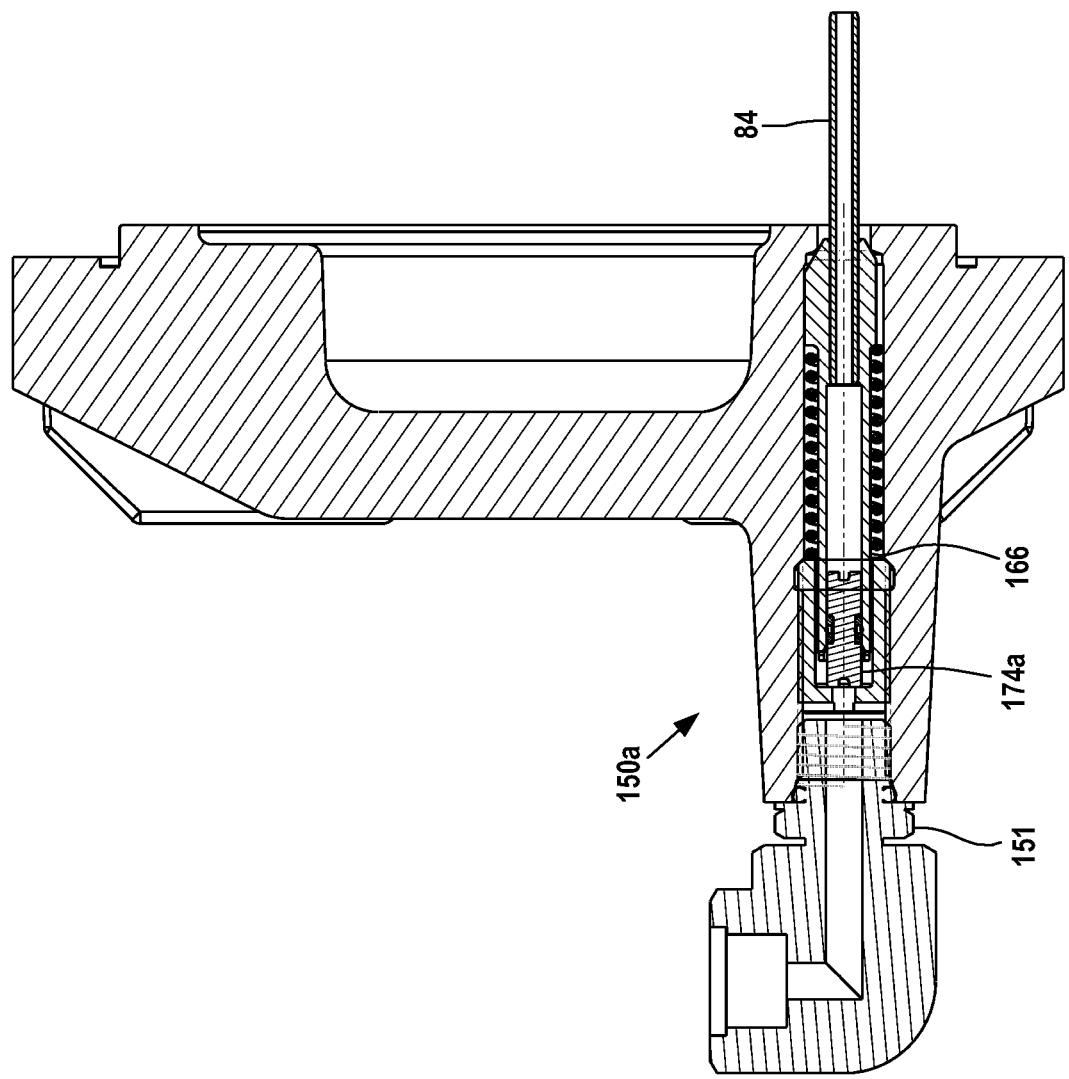
FIG. 9 is a sectional view of a second embodiment normally-closed shutoff valve for use with the power steering system shown in FIG. 3.

FIG. 9 illustrates a modified adjustable shutoff valve 150a similar to the shutoff valve 150, with corresponding components identified with the same reference numerals. The setscrew 174 is replaced by a plug 174a that sealingly slides along the inside of the tube 166. If the position of the plunger 84 needs to be reset, the SAE fitting 151 is removed and the plug 174a is tapped further into the tube 166, pushing the plunger 84 farther into the motor chamber.

Figure 10:
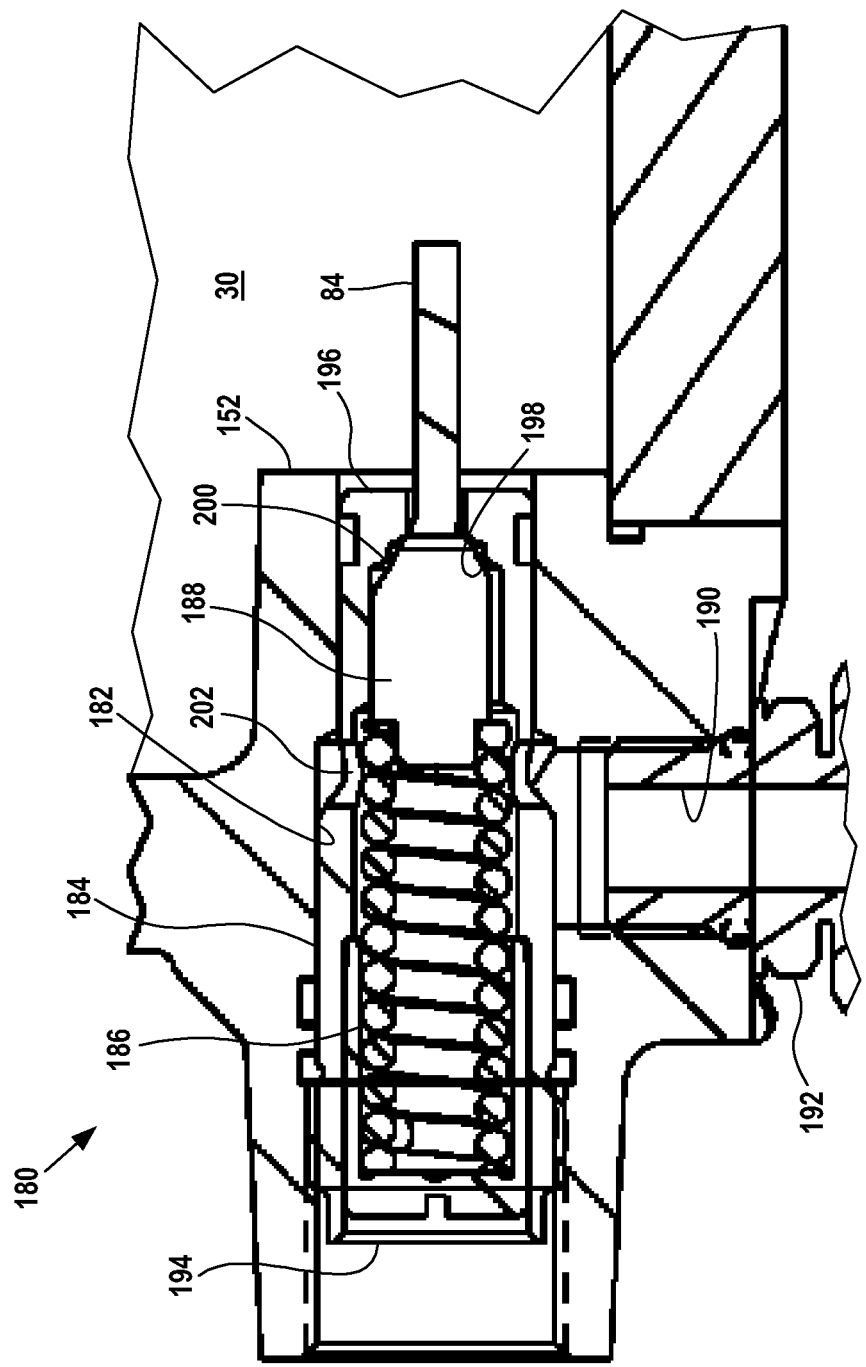
FIG. 10 is a sectional view of a third embodiment normally-closed shutoff valve for use with the power steering system shown in FIG. 3.

FIG. 10 illustrates a second embodiment shutoff valve 180 for forming a shutoff valve 44 or 46 (FIG. 10 illustrating the valve 180 forming the shutoff valve 44). The distance the plunger 84 extends into the motor chamber 30 or 32 is manually adjustable.

The shutoff valve 180 includes a horizontal bore 182 that extends through the cylinder wall 152 and opens into the motor chamber 30. A tubular spring retainer 184 is located in the bore 182 and houses a compression spring 186 and a movable valving member 188 that opens and shuts the valve 180. The plunger 84 is fixedly attached to the valving member 188 and extends into the motor chamber 30. A vertical bore 190 extends from the bore 182 and is connected to an SAE plug 192 that receives an end of the supply line 38 (not shown).

The horizontal bore 182 has an enlarged, threaded end away from the motor chamber that cooperates with threads on the outside of the spring retainer 184 to adjustably position the spring retainer in the bore 182 and thereby manually adjust the distance the plunger 84 extends into the motor chamber 30.

The spring retainer 184 has a closed end 194 and an open end 196 facing the motor chamber. The end 196 defines a conical valve seat 198 that cooperates with a conical valve surface 200 on the valving member 188 to open and close the valve. Circumferentially-spaced openings 202 extend through the thickness of the spring retainer 184 and enable fluid flowing from the vertical bore 190 to flow into the interior of the retainer 184.

During normal operation, fluid pressure in the spring retainer 184 cooperates with the spring 186 to force the valving member 188 against the valve seat 198, closing the valve 180.

When the piston 28 engages the plunger 84 and moves the valving body 188 off the valve seat 198, fluid flows from the supply line 38 and into the motor chamber 30 to relieve power steering assist. The fluid enters the bore 190 through the SAE plug 192, flows into the spring retainer 184 and through circumferentially spaced-apart concave lobes or depressions (not shown) formed on the valving member 188, discharging through the bore 182 into the motor chamber 30.

When the piston 28 moves back towards its centered position, the spring 184 and the fluid pressure in the bore 182 cooperate to force the valving body 188 against the valve seat 200 and close the valve.

The illustrated shutoff valve embodiments 150, 150a, and 180 extend axially from the ends of the hydraulic cylinder 28, extending the overall length of the fluid motor assembly.

FIG. 11 illustrates a portion of another power steering system 210 in accordance with the present invention that does not extend the axial length of the fluid motor assembly. In this embodiment the shutoff valves 44, 46 are carried in the piston 28. The power steering system 210 is otherwise similar to the power steering system 110, and so only the differences will be described.

The second common fluid line segment 64 includes a line segment 212 formed in the piston 28 that extends from the outer surface of the piston to the junction 66, and a seal assembly 214 that sealingly connects the line segment 212 with the remainder of the line segment 64 throughout axial motion of the piston 28. The seal assembly 214 utilizes a slipper seal assembly identical to that used in a steering gear sold commercially by the assignee of the present invention under the trademark MODEL 92 STEERING GEAR and so will not be described in detail. The portions of the supply lines 38, 40 downstream from the junction 66 are defined by two interior bores 216, 218 in the piston 28 that lead to the shutoff valves 44, 46 respectively. The check valves 68, 70 (not shown) can be located in the bores 216, 218 respectively.

The shutoff valves 44, 46 are each similar to the shutoff valve 180, with the spring retainer threaded into a bore extending inwardly from the piston face into the piston and fluidly connected to a supply line 38 or 40.

FIG. 11 illustrates the power steering system 210 with the piston 28 in its centered position and the shutoff valves 44, 46 closed for normal power steering operation. The plunger 84 of the left shutoff valve 44 extends from the piston into the left motor chamber 30 and the plunger 84 of the right shutoff valve 46 extends from the piston into the right motor chamber 32.

FIG. 12 illustrates the power steering system 210 with the piston 28 moved to left end of its stroke. The left plunger 84 presses against the cylinder wall 152, opening the valve 44 and relieving power steering assist as previously described.

The power steering systems 110 and 210 each utilize fluid signal lines 38, 40 to signal when the piston 28 reaches an end of stroke position. The fluid pressure in the signal lines 38, 40 is also used to open and close the shutoff valve 42 and maintain the valve 42 in such opened or closed state. In other possible embodiments of the invention the signals represented by the pressure in the signal lines can be used to initiate another ways of opening or closing the valve 42. For example, a pressure switch can be located in each signal line 38, 40 that electrically opens or closes the valve 42 depending on the pressure in the signal line.

Figure 13:
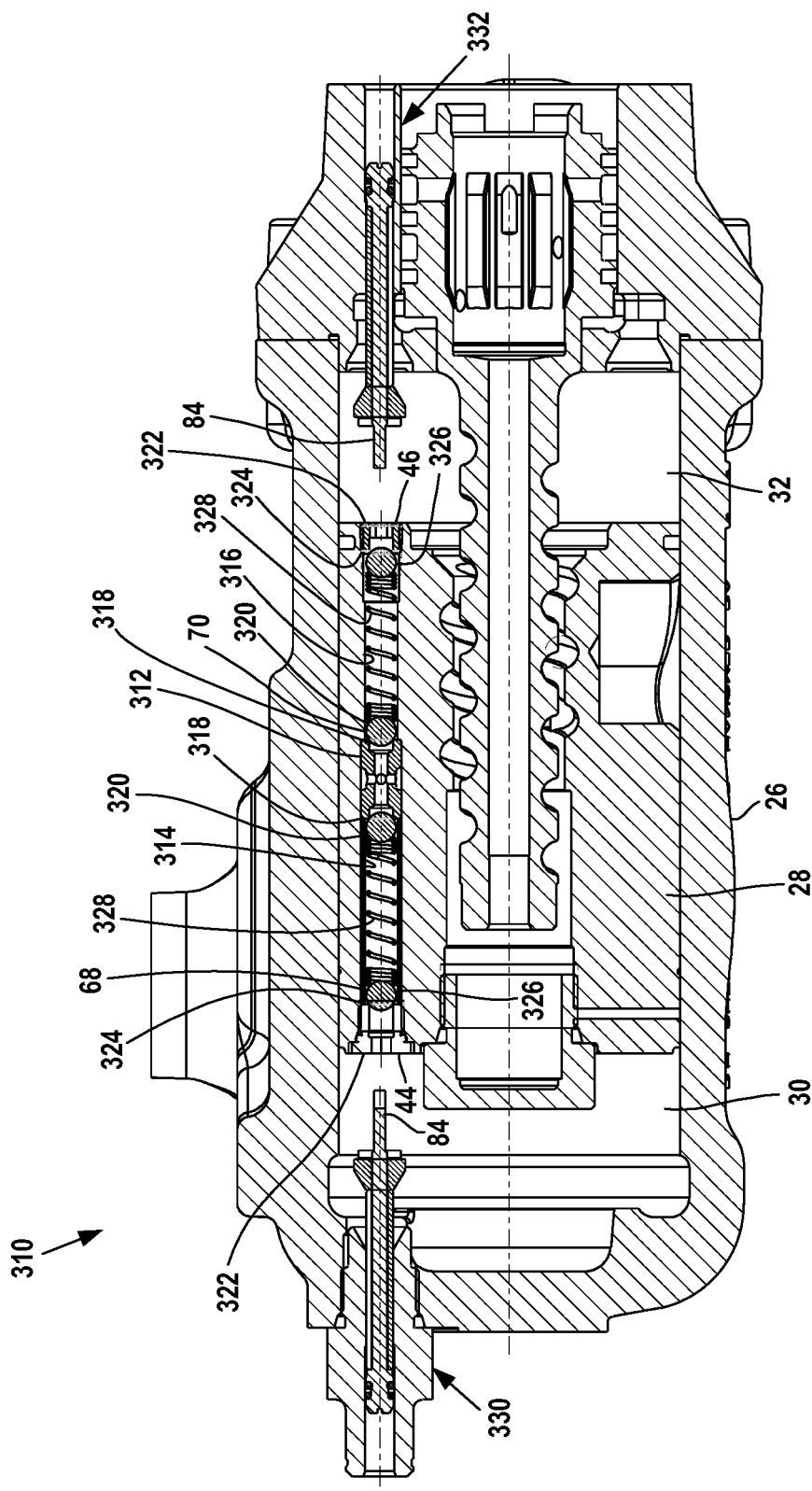
FIG. 13 illustrates a portion of still another embodiment of the power steering system in accordance with the present invention.

FIG. 13 illustrates a portion of yet another power steering system 310 in accordance with the present invention that is similar to the power steering system 210, and so only the differences will be described.

The signal line junction 66 is formed as a tubular body 312 having a central bore that is coaxial with and fluidly connects straight fluid line segments 314 and 316 formed in the piston 28. Line segment 314 extends from the body 312 and opens in the motor chamber 30, and line segment 316 extends from the body 312 and opens into the motor chamber 32. The check valve 68 and the check valve 70 are located in the line segments 314 and 316 respectively. Each check valve 68 and 70 includes a respective axial end of the body 312 that defines a valve seat 318 and a valving member formed as a ball 320 that opens and closes the check valve. Each shutoff valve 44 and 46 includes a tubular plug 322 that screws into the open end of the line segment 314 or 316 and defines a valve seat 324 that cooperates with a valving member formed as a ball 326 that opens and closes the shutoff valve. A compression spring 328 in each line segment 314, 316 extends between the balls 320, 326 in the line segment and urges the balls 320, 326 again their respective valve seats 318, 324.

The plungers 84 that actuate and open the shutoff valves 44, 46 are carried in adjustable plunger assemblies 330, 332 mounted through the axially opposed walls of the hydraulic cylinder 26. The plunger assemblies 330, 332 are similar in construction to the plunger assemblies disclosed in Sheppard U.S. Pat. No. 6,050,171 assigned to the assignee of the present invention and so will not be described in detail.

FIG. 13 illustrates the power steering system 310 with the piston 28 in its centered position. The shutoff valve 42 is open and fluid pressure at the junction 66 opens the check valves 68, 90 and exposes the balls 326 to fluid pressure that closes the shutoff valves 44, 46 during normal operation of the power steering system.

Assume that the power steering system 310 is actuated to move the piston 28 towards the left end of its piston stroke. High-pressure fluid in the motor chamber 32 urges the piston 28 to the left, and urges the ball 326 of the shutoff valve 46 away from its valve seat 324. The fluid pressure on both sides of the ball 326 is essentially equal and so the spring force keeps the shutoff valve 46 closed.

When the piston 28 reaches the left end of the piston stroke, the actuator 84 of the plunger assembly 330 engages the ball 326 of the shutoff valve 44 and opens the valve 44, relieving power assist as previously described. The fluid pressure at the junction 66 decreases because of the pressure drop causing the shutoff valve 42 to close. The drop in pressure may enable the shutoff valve 46 to open, but the check valve 70 remains closed and prevents fluid communication between the junction 66 and the right motor chamber 32.

The power steering systems 110, 210, 310 described above respond to a low-pressure signal transmitted through signal line 38 or signal line 40 to close the shutoff valve 42. FIGS. 14-17 illustrate a power steering system 410 in accordance with the present invention that is responsive to a high-pressure signal to close the shutoff valve 42.

Figure 14:
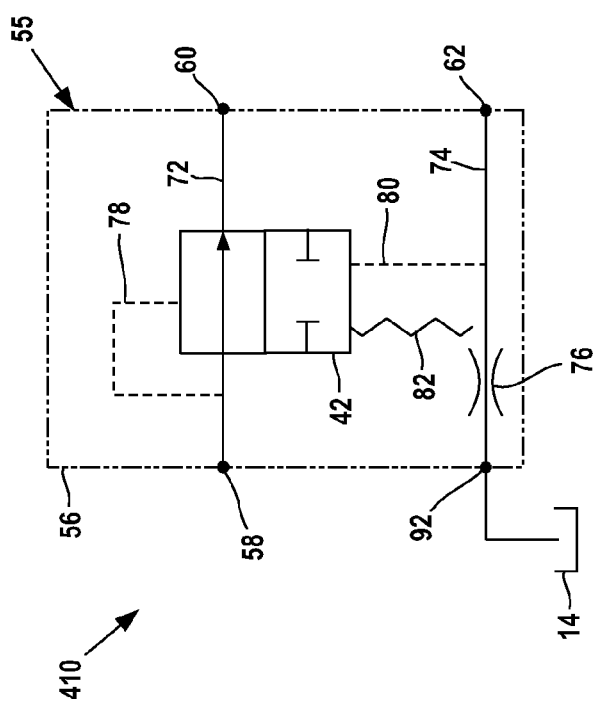
FIG. 14 illustrates the control block of an additional embodiment of the power steering system in accordance with the present invention.

FIG. 14 illustrates the control block 55 of the system 410. The control block 55 of the system 410 is similar to the control block 55 of the system 110 and so only the differences will be discussed. The fluid line 74 is not connected to the inlet 58, but is instead connected to the exhaust 14 at a port 92 as shown. During normal operation of the power steering system 410, the fluid pressure in the fluid line 74 is at or near exhaust pressure, and less than the fluid pressure at the inlet 58. The force generated by the pilot line 78 urging the shutoff valve 42 open overcomes the combined force generated by the pilot line 80 and the spring 82 urging the valve 42 closed and fluid flows to the control valve 20 for normal power steering operation.

When an end-of-travel condition occurs, the fluid pressure in the fluid line 74 increases to essentially full system pressure. The closing force generated by the pilot line 78 and the spring 82 overcomes the opening force generated by the pilot line 78 and the shutoff valve 42 closes to remove power steering assist as previously described.

Figure 15:
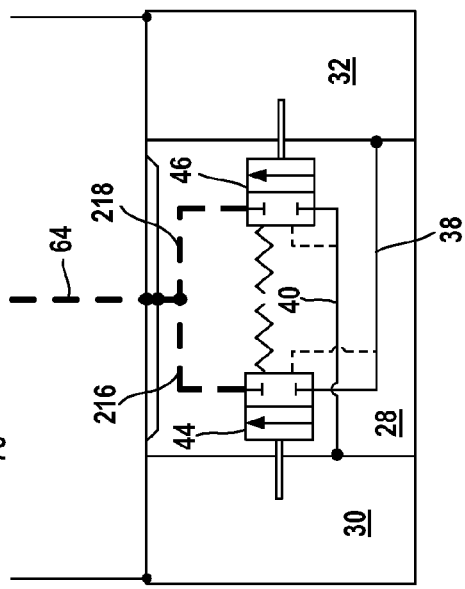
FIG. 15 illustrates a portion of the power steering system shown in FIG. 14 with the piston in the centered position.

As shown in FIG. 15, the shutoff valves 44, 46 are carried in the piston 28 in a manner similar to that of the power steering systems 210 and 310. The signal line 38 opens into the right motor chamber 32 and the signal line 40 opens into the left motor chamber 30. FIG. 15 illustrates the power steering system 410 with the piston 28 in its centered position and the shutoff valves 44, 46 closed for normal power steering operation. The signal lines 216, 218, and 64 contains fluid at relatively low pressure and so the shutoff valve 42 is open for normal power steering operation.

Figure 16:
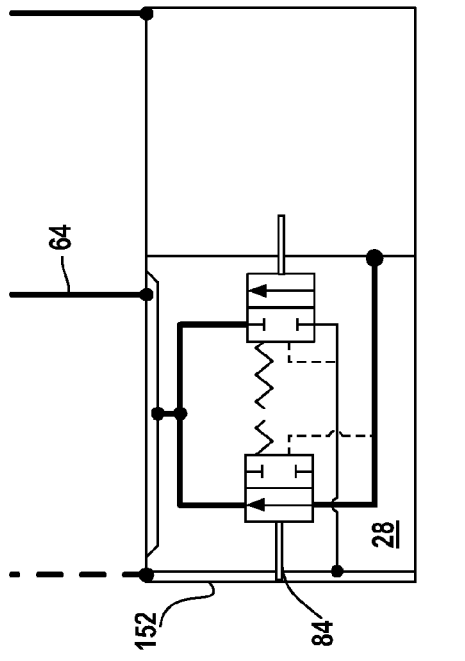
FIG. 16 illustrates the power steering system shown in FIG. 14 relieving power assist when the piston reaches an end of its piston stroke.

FIG. 16 illustrates the power steering system 410 with the piston 28 moved to the left end of its stroke. The left plunger 84 presses against the cylinder wall 152, opening the valve 44 and communicating the signal line 64 with the high pressure fluid in the right motor chamber 32. The increase in fluid pressure closes the shutoff valve 44 and relieves power steering assist. When the piston 28 starts returning to its centered position, the fluid pressure in the signal line 64 will drop and the shutoff valve 44 closes to return the system to normal power steering operation.

Figure 17:
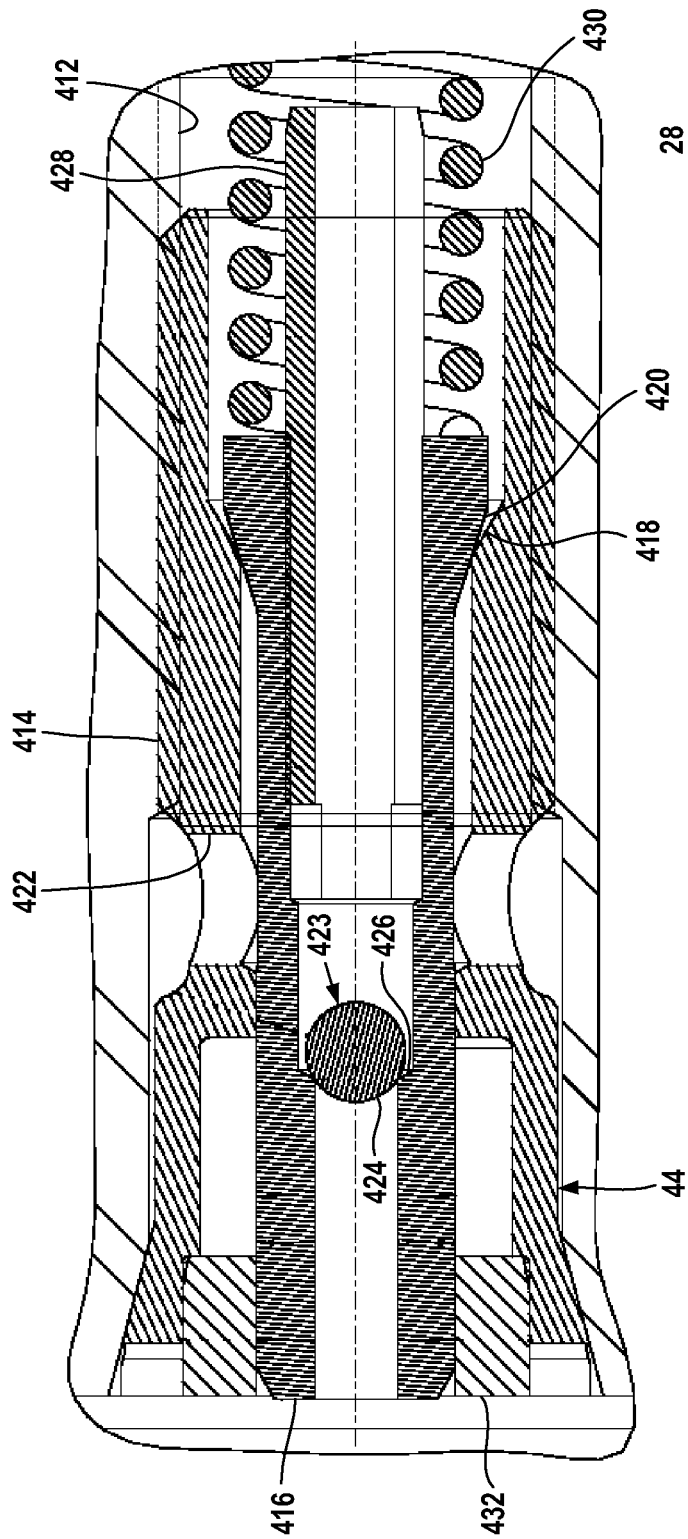
FIG. 17 is a partial sectional view illustrating the left shutoff valve of the power steering system shown in FIG. 14.

FIG. 17 illustrates in greater detail the left shutoff valve 44 of the power steering system 410, it being understood that the right shutoff valve 46 has similar construction. The plunger assemblies that actuate the shutoff valves 44, 46 are identical to those in the power steering system 310 and so will not be described.

The shutoff valves 44, 46 are screwed into opposite threaded ends of an axial bore 412 extending through the piston 28. The valve 44 includes a tubular valve housing 414 that screws into the bore and a tubular and an axially movable valving member 416 carried in the housing. The housing 414 and the valving member 416 define cooperating conical valving surfaces 418, 420 that open and close the valve 44 with axial movement of the valving member 416. The signal line 216 opens into the bore 412 where the housing 414 has a reduced-diameter carrying radial bores 422 that communicate the interior of the housing 412 with the signal line 216. The valving member 416 carries an interior check valve assembly 423 defined by a ball 424 and valve seat 426. A roll pin 428 extends from the inner end of the valving member 416 and supports one end of a compression spring 430. The other end of the compression spring 430 is supported on the roll pin of the valve 46 such that the compression spring 430 urges both valves 44, 46 closed. A nut 432 seals the outer end of the valve housing 414.

Assume that normal operation of the power steering system 410 urges the piston 28 towards the left as viewed in FIG. 16. High-pressure fluid in the left motor chamber 32 opens the check valve 423 of the shutoff valve 46, allowing high-pressure fluid to enter the piston bore 412. The high-pressure fluid urges the valve 44 closed and urges the check valve 423 of the shutoff valve 44 closed.

When the piston 28 reaches the left end of its stroke, the left plunger assembly engages the valve member 416 and pushes the valve member 416 into the bore 412 against the spring, opening the shutoff valve 44. High-pressure fluid in the bore 412 flows into the interior of the valve housing 414 and comes into fluid communication with the sensor line 66. The pressure increase in the sensor line 66 causes the shutoff valve 42 to close, relieving power steering assist.

In still other embodiments the shutoff valve 42 can be directly actuated by movement of the piston or suspension member. For example, plungers can be provided extending into the motor chambers that act to open or close electrical contacts that in turn open or close the shutoff valve 42.

Figure 18:
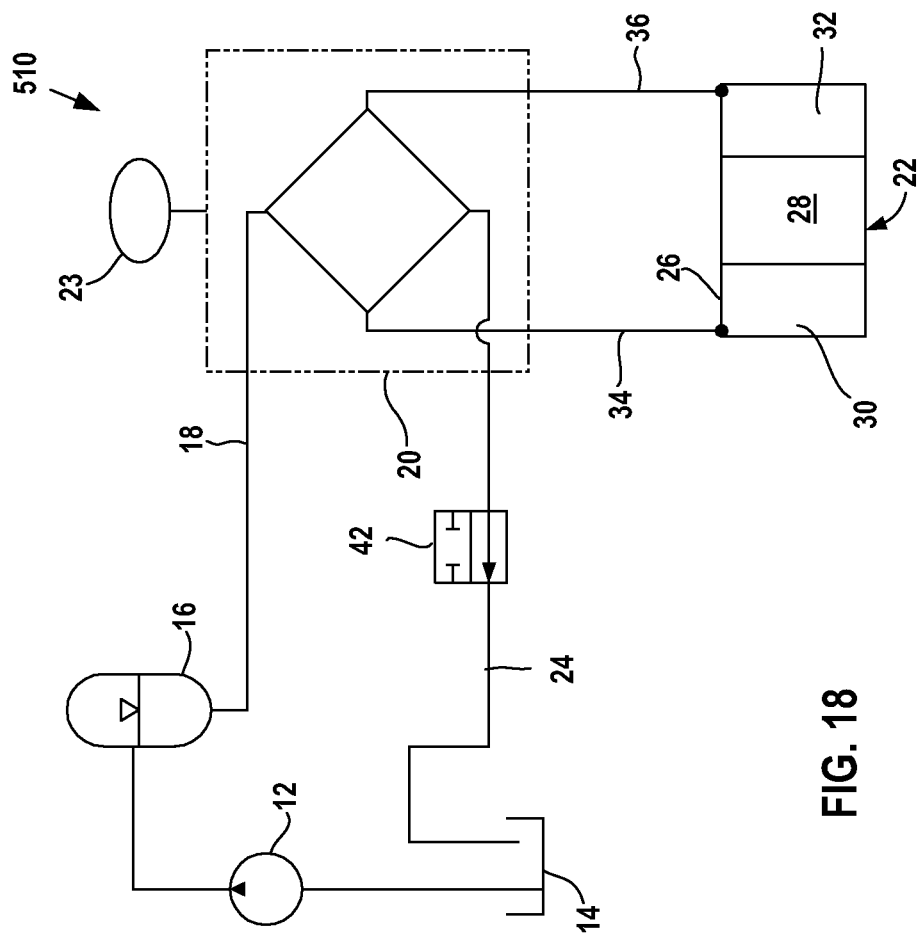
FIG. 18 illustrates another embodiment of the power steering system in accordance with the present invention.

Another alternative embodiment to generate hydraulic lock of the fluid motor 22 by closing a shutoff valve is shown in FIG. 18, which illustrates a power steering system 510 in which the normally-open shutoff valve 42 is placed in the exhaust line 24. Corresponding elements of the system 510 that are the same as in power steering system 10 are shown with the same reference numerals. When the shutoff valve 42 is closed, fluid cannot flow out of the low-pressure motor chamber 30 or 32. This places the fluid motor 22 in hydraulic lock, relieving power assist.

Figure 19:
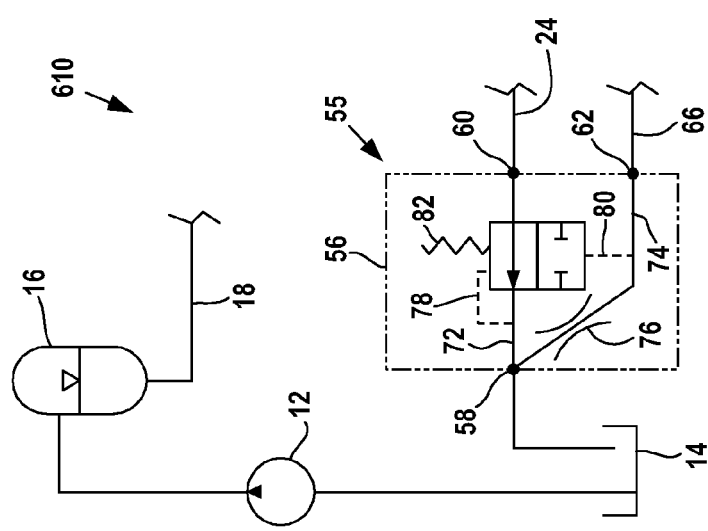
FIG. 19 illustrates the control block of the power steering system shown in FIG. 18.

FIG. 19 illustrates a portion of a power steering system 610 having the shutoff valve 42 defined by the control block 55 located in the exhaust line 24. The control block 55 of the system 610 is similar to the control block 55 of the system 110 but operates in response to a low-pressure signal to close the valve 42. The shutoff valves 44, 46 of the power steering system 610 are the same construction as shown in FIG. 17 and so are not shown in the figure.

Figure 20:
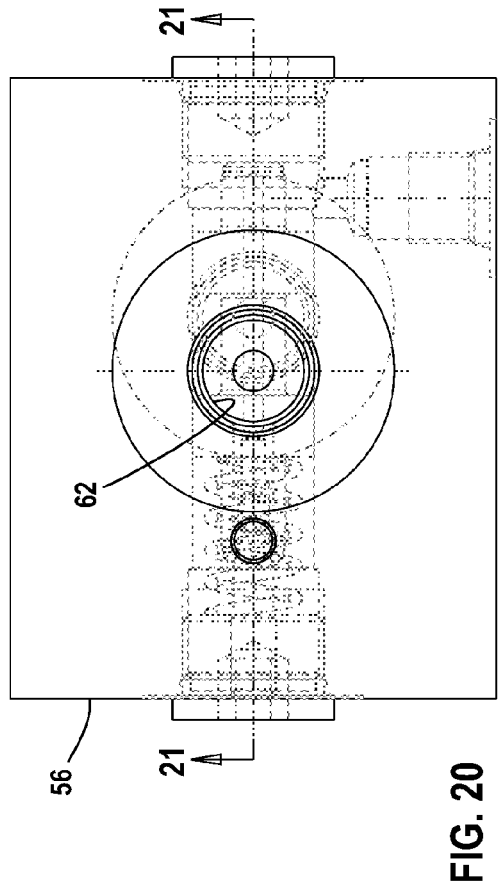
FIG. 20 is a front view of the valve body of the control block shown in FIG. 19.
Figure 21:
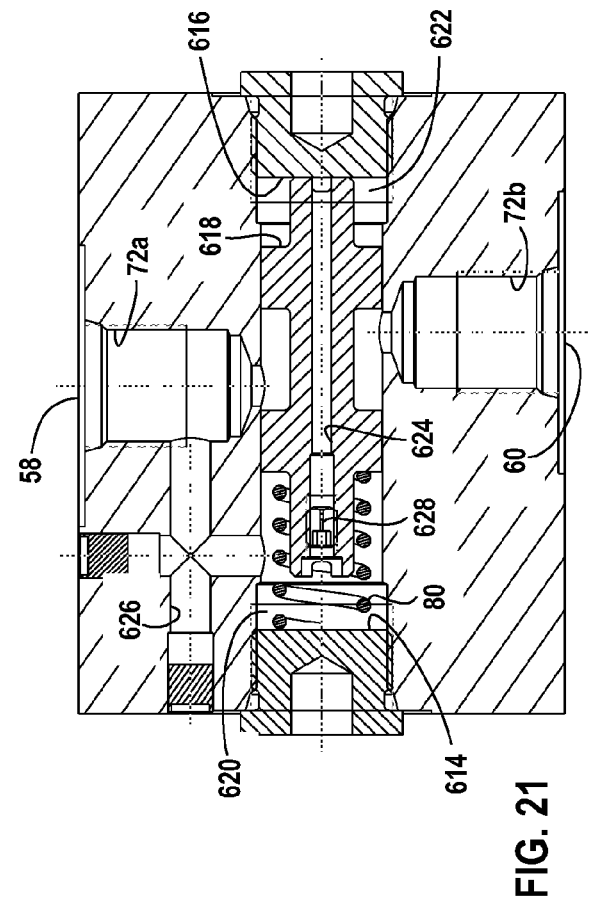
FIG. 21 is a sectional view of the valve body taken along line 21-21 of FIG. 20.

FIGS. 20 and 21 illustrate an embodiment of the valve body 56 of the power steering system 610. The flow channel 72 connecting the ports 58 and 60 has axially offset flow portions 72a, 72b that intersect a control channel formed as a cylindrical bore 612. The control channel 612 is closed by end walls 614, 616. An axially-movable spool valve 618 is in the control channel 612 and defines control chambers 620, 622 on opposite sides of the valve. The spring 82 is in the chamber 620 and urges the spool valve 618 to its opened position against the end wall 616. The spool valve 618 has a reduced diameter intermediate portion that enables flow through the flow channel 72 when the spool valve 618 is against the end wall 616. The fluid line 74 flows into the chamber 620 and then to the chamber 618 through an axial bore 624 in the spool valve 618, and then to the port 58 via flow channel 626. A flow restriction 628 in the bore 622 defines the orifice 76.

During normal power steering operation the exhaust line 24 and the signal line 66 contain low-pressure fluid that communicates with chambers 614, 618 and so the fluid pressure on both ends of the spool valve 618 is essentially equal. Spring 82 maintains the spool valve 618 in its opened position as shown in FIG. 21.

When the fluid pressure in the signal line 66 increases to essentially system pressure indicating the piston 28 has reached an end of travel, the pressure in the chamber 622 increases and forces the spool valve 618 to its closed position against the end wall 620. The spool valve 618 blocks the flow channel 72 and prevents the flow of fluid out of the fluid motor 22, thereby relieving power assist.

The power steering systems 110, 210, 310, 410, 510, 610 utilize a single normally-open shutoff valve 42 between the accumulator 16 and the control valve 20 or between the reservoir 14 and the control valve 20 to relieve power steering assist. When the shutoff valve 42 is closed, the fluid motor 22 is in "hydraulic lock" and the piston 22 cannot move because fluid cannot flow into or out of the fluid motor 22.

In other possible embodiments one or both of the supply lines 34, 36 extending between the control valve 20 and the fluid motor 22 can include a normally-open shutoff valve 42 to generate hydraulic lock when closed and relieve power steering assist.

Figure 22:
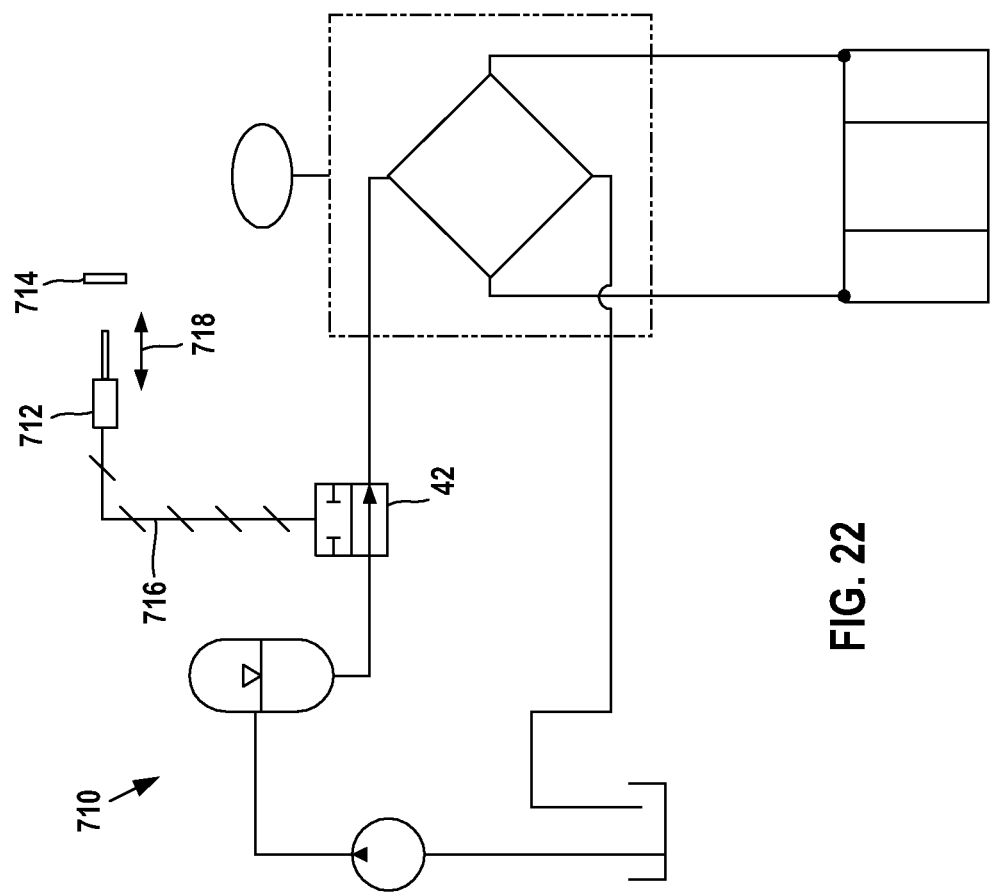
FIG. 22 illustrates a yet additional embodiment of the power steering system in accordance with the present invention.

The power steering systems described above utilize changes in fluid pressure to indicate that the piston has reached an end of stroke condition. FIG. 22 illustrates a power steering system 710 in accordance with the present invention that utilizes opening or closing electrical connections to indicate a steerable wheel is approaching end of travel. Components of the power steering system 710 that are functionally identical to the components of the steering system 10 are identified with identical reference numerals.

In this embodiment the normally-open shutoff valve 42 is an electrically-operated valve. The valve is operatively connected to a pair of electric switches or limit switches 712 that are each engageable with a respective contact member or contact plate 714 to open and close an electrical circuit 716 to open and close the shutoff valve 42 (one switch 712 and contact plate 714 pair is shown in the figure). One of the switch 712 and the contact member 714 is attached to a movable portion of the vehicle steering linkage or axle assembly and the other of the switch 712 and the contact member 714 is stationary with respect to the one member. The arrow 718 indicates the relative movement of a switch 712 with respect to the contact plate 714 caused by movement of the steerable wheels.

Each switch 712 and the contact member 714 pair in the illustrated embodiment are located to engage one another and close the electric circuit 716 just before the end of wheel travel is reached in a respective left or right turn, closing the shutoff valve 42 and relieving power assist. Signal lines utilizing or transmitting fluid pressure signals, such as discussed with respect to other embodiments above, can be used to signal that steering assist should be restored and the shutoff valve 42 opened. In other possible embodiments of the power steering system 710 switches attached to the steering column or other steering assembly members could signal that the control valve 20 is centered and that the shutoff valve 42 should be opened.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

The invention claimed is:

1. A power steering apparatus for a vehicle having at least one steerable wheel movable along a steering stroke towards an axle stop defining the end of the steering stroke, the apparatus comprising:
a fluid motor for moving the at least one steerable wheel, the fluid motor comprising a piston axially movable for moving the at least one steerable wheel along the steering stroke, the piston dividing the cylinder into first and second motor chambers on opposite sides of the piston;
a first motor line fluidly connected to the first motor chamber and a second motor line fluidly connected to the second motor chamber;
a source of high-pressure fluid and an exhaust;
a supply line fluidly connected to the fluid source and an exhaust line fluidly connected to the exhaust;
a control valve connected to the supply line, the exhaust line, and the first and second motor lines, the control valve placeable in centered and non-centered conditions in response to driver steering input, the control valve when in the non-centered condition fluidly interconnecting the supply line and the first motor line to form a high-pressure line from the high-pressure fluid source to the first motor chamber and fluidly interconnecting the exhaust line and the second motor line to form a low-pressure line from the second motor chamber to the exhaust whereby fluid pressure in the first motor chamber urges the piston towards the second motor chamber;
a shutoff valve;
when the control valve is in the non-centered condition the shutoff valve is disposed in one of (a) and (b): (a) the high-pressure line and (b) the low-pressure line;

the shutoff valve being open when the at least one steerable wheel is away from the axle stop and permitting flow through the line associated with the shutoff valve; and the shutoff valve closing when the at least one steerable wheel approaches the axle stop and thereby blocking flow through the line associated with the shutoff valve.

2. The power steering system of claim 1 wherein the shutoff valve is disposed in the supply line.

3. The power steering system of claim 1 wherein the shutoff valve is disposed in the exhaust line.

4. The power steering system of claim 1 wherein the shutoff valve is disposed in the first motor line or the second motor line.

5. The power steering system of claim 1 comprising a signal line operatively connected to the shutoff valve, the signal line transmitting a signal representing that the at least one steerable wheel is nearing the axle stop, the shutoff valve configured to close in responsive to the signal.

6. The power steering system of claim 5 wherein the signal line is an electrical line and transmits an electrical signal.

7. The power steering system of claim 5 wherein the signal line is a fluid line and transmits a fluid pressure signal.

8. The power steering system of claim 7 wherein the signal line fluidly connects the shutoff valve and one of the first and second motor chambers.

9. The power steering system of claim 8 wherein the shutoff valve represents a first shutoff valve and including a second shutoff valve, the second shutoff valve disposed in the signal line, the second shutoff valve closed when the at least one steerable wheel is away from the axle stop, the second shutoff valve open when the at least one steerable wheel nears the axle stop so that the signal line transmits a pressure signal to the shutoff valve.

10. The power steering system of claim 9 wherein the second shutoff valve is operatively connected to the piston whereby movement of the piston opens and closes the second shutoff valve.

11. The power steering system of claim 10 wherein the first shutoff valve is disposed in the exhaust line, the signal line is fluidly connected to the first motor chamber to transmit a high-pressure signal to the shutoff valve when the piston reaches a position corresponding to the at least one steerable wheel nearing the axle stop, the first shutoff valve closing in response to the high-pressure signal.

12. The power steering system of claim 1 wherein the shutoff valve comprises a valve body and a spool valve movable with respect to the valve body to open and close the shutoff valve.

13. A method of moving a steerable wheel of a vehicle towards an axle stop using a power steering system of the vehicle and substantially relieving power steering assist before the steerable wheel hits the axle stop, the power steering system of the type having a source of high-pressure fluid, a piston in a hydraulic cylinder and sealingly dividing the cylinder into two chambers on opposite sides of the piston, a first fluid line fluidly connecting the fluid source with one of the cylinder chambers and a second fluid line connecting the other cylinder chamber to an exhaust, the piston operatively connected to the steerable wheel and movable in the cylinder along a piston stroke, the steerable wheel moving towards the axle stop as the piston moves along the piston stroke, the method comprising the steps of:

(a) flowing high-pressure fluid through the first fluid line and into the one cylinder chamber and connecting the other cylinder chamber to an exhaust, the high-pressure fluid flowing into the one cylinder chamber moving the piston towards the end of the piston stroke, the piston movement forcing fluid out of the second chamber through the second fluid line; and (b) closing the first fluid line or the second fluid line before the steerable wheel hits the axle stop.

14. The method of claim 13 comprising the steps of:

(c) generating a signal when the steerable wheel nears the axle stop; and (d) performing step (b) in response to said signal.

15. The method of claim 14 wherein step (c) comprises the step of:

(e) generating one of: a fluid pressure signal and an electrical signal.

16. The method of claim 13 comprising the steps of:

(c) placing a normally-open shutoff valve in the first fluid line or the second fluid line;

(d) fluidly communicating the shutoff valve with one of the fluid motor chambers when the steerable wheel nears the axle stop; and (e) closing the shutoff valve to perform step (b) when the shutoff valve is in fluid communication with the one motor chamber.

17. The method of claim 16 comprising the steps of:

(f) extending a signal line from the one motor chamber to the shutoff valve and placing a normally-closed shutoff valve in the signal line; and (g) opening the normally-closed shutoff valve when the piston has reached a predetermined position along its stroke to perform step (d).

* * * * *